US011105953B2

(12) United States Patent
Nitsche et al.

(10) Patent No.: US 11,105,953 B2
(45) Date of Patent: Aug. 31, 2021

(54) DETECTING CHANGES IN AN ENVIRONMENTAL CONDITION ALONG A WELLBORE

(71) Applicant: Halliburton Energy Services, Inc., Houston, TX (US)

(72) Inventors: Wolfgang Hartmut Nitsche, Humble, TX (US); Yenny Natali Martinez, Houston, TX (US); David Andrew Barfoot, Houston, TX (US); Michel Joseph LeBlanc, Houston, TX (US); Jose R. Sierra, Mexico DF (MX); John Laureto Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 364 days.

(21) Appl. No.: 16/305,514

(22) PCT Filed: Sep. 2, 2016

(86) PCT No.: PCT/US2016/050082
§ 371 (c)(1),
(2) Date: Nov. 29, 2018

(87) PCT Pub. No.: WO2018/044318
PCT Pub. Date: Mar. 8, 2018

(65) Prior Publication Data
US 2021/0231830 A1    Jul. 29, 2021

(51) Int. Cl.
*E21B 34/06*    (2006.01)
*E21B 47/113*    (2012.01)
(Continued)

(52) U.S. Cl.
CPC .............. *G01V 8/16* (2013.01); *E21B 34/06* (2013.01); *E21B 47/06* (2013.01); *E21B 47/07* (2020.05); *E21B 47/114* (2020.05); *E21B 49/087* (2013.01)

(58) Field of Classification Search
CPC ......... E21B 34/06; E21B 47/06; E21B 47/114
See application file for complete search history.

(56) References Cited

U.S. PATENT DOCUMENTS

| 7,511,819 B2 * | 3/2009 | DiFoggio | ............... E21B 49/10 356/436 |
| 10,975,687 B2 * | 4/2021 | Langnes | ............... G01V 1/001 |

(Continued)

FOREIGN PATENT DOCUMENTS

WO    WO 2016/007161 A1    1/2016

OTHER PUBLICATIONS

International Search Report and the Written Opinion of the International Search Authority, or the Declaration, dated May 29, 2017, PCT/US2016/050082, 10 pages, ISA/KR.

*Primary Examiner* — Shane Bomar
(74) *Attorney, Agent, or Firm* — Haynes and Boone, LLP

(57) ABSTRACT

A method and system can include positioning an optical waveguide along a wellbore, and launching one or more optical signals into the waveguide at one or more optical signal frequencies and during one or more time periods, thereby resulting in one or more backscattered signals being received by the receiver, which produces a trace for each of the one of more backscattered signals. Changing an environmental condition in the wellbore, generating additional backscattered light signals at one or more frequencies after the change. Comparing the traces generated before the condition change to those generated after the change, identifying a before trace and an after trace that are substantially equal to each other and identifying a frequency difference (Continued)

between these traces. The frequency difference can be used to determine the amount of change in the environmental condition that occurred when the environmental change event happened.

22 Claims, 14 Drawing Sheets

(51) Int. Cl.
*E21B 47/06* (2012.01)
*G01V 8/16* (2006.01)
*E21B 47/07* (2012.01)
*E21B 49/08* (2006.01)

(56) References Cited

U.S. PATENT DOCUMENTS

| | | |
|---|---|---|
| 2005/0274513 A1 | 12/2005 | Schultz et al. |
| 2007/0165691 A1 | 7/2007 | Taverner et al. |
| 2009/0114386 A1* | 5/2009 | Hartog .................... E21B 43/26 166/250.08 |
| 2013/0167628 A1* | 7/2013 | Hull ...................... E21B 47/117 73/152.58 |
| 2013/0257435 A1 | 10/2013 | Smithson |
| 2013/0341008 A1 | 12/2013 | Brady et al. |
| 2014/0152995 A1* | 6/2014 | Dong ..................... G01D 18/00 356/477 |
| 2016/0252651 A1* | 9/2016 | Ellmauthaler ........... G01V 1/40 356/72 |
| 2017/0183959 A1* | 6/2017 | Ellmauthaler ........ E21B 47/135 |
| 2018/0231498 A1* | 8/2018 | Amir ...................... G01F 1/661 |
| 2019/0369276 A1* | 12/2019 | Barfoot ................. G01V 1/226 |
| 2020/0032644 A1* | 1/2020 | Xia ..................... G01D 5/35358 |
| 2020/0271811 A1 | 8/2020 | Wilson ..................... G01V 1/48 |
| 2021/0032985 A1* | 2/2021 | Stark ...................... E21B 47/12 |
| 2021/0096020 A1* | 4/2021 | Stark ...................... G01V 1/226 |

\* cited by examiner

DETECTING CHANGES IN AN ENVIRONMENTAL CONDITION ALONG A WELLBORE

PRIORITY

The present application is a U.S. National Stage patent application of International patent Application No. PCT/US2016/050082, filed on Sep. 2, 2016, the benefit of which is claimed and the disclosure of which is incorporated herein by reference in its entirety.

TECHNICAL FIELD

The present disclosure generally relates to oilfield equipment and, in particular, to downhole tools, drilling and related systems, and techniques for determining a change in an environmental condition in a wellbore. More particularly still, the present disclosure relates to systems and methods for calculating the change in the environmental condition in the wellbore based on a change in an optical frequency from a frequency of a trace measured before the change to a frequency of a trace measured after the change, where the environmental condition can be at least one of temperature, pressure, and strain.

BACKGROUND

The Joule-Thomson effect causes temperature of a fluid (e.g. a gas or liquid) to change if it is pushed through a throttle, orifice, choke, or similar device, while preventing heat exchange between the fluid and the environment (that is, via an adiabatic process). The strength of the Joule-Thomson effect may depend on the particular fluid, its phase or phases, its composition (for solutions and mixtures), pressure and temperature. The effect is characterized by a coefficient called the Joule-Thomson coefficient and both the sign and magnitude of this coefficient vary with pressure, temperature, and composition of the fluid. In the case of gases in typical ambient conditions a significant cooling occurs when the gas undergoes a pressure change, such as in most refrigerators and air-conditioning systems. In the case of liquids that undergo a pressure change, the Joule-Thomson effect can be much weaker, which can result in a much smaller change in a temperature of the liquid.

Because pressure changes in a gas, when compared to a liquid, may cause more significant temperature changes, these changes can be detected and monitored by systems such as a Distributed Temperature Sensing (DTS) system, which can use Rayleigh, Raman, and/or Brillion backscattering techniques with an optical waveguide positioned in a wellbore to measure environmental conditions (such as temperature, etc.) in the wellbore. However, the change in temperature for liquids due to a pressure change, flow rate, etc. is not readily detected using the DTS systems because the changes in temperature can be below the resolution of these DTS systems.

Therefore, it will be readily appreciated that improvements in the arts of determining changes in environmental conditions in a wellbore are continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Figure 1:
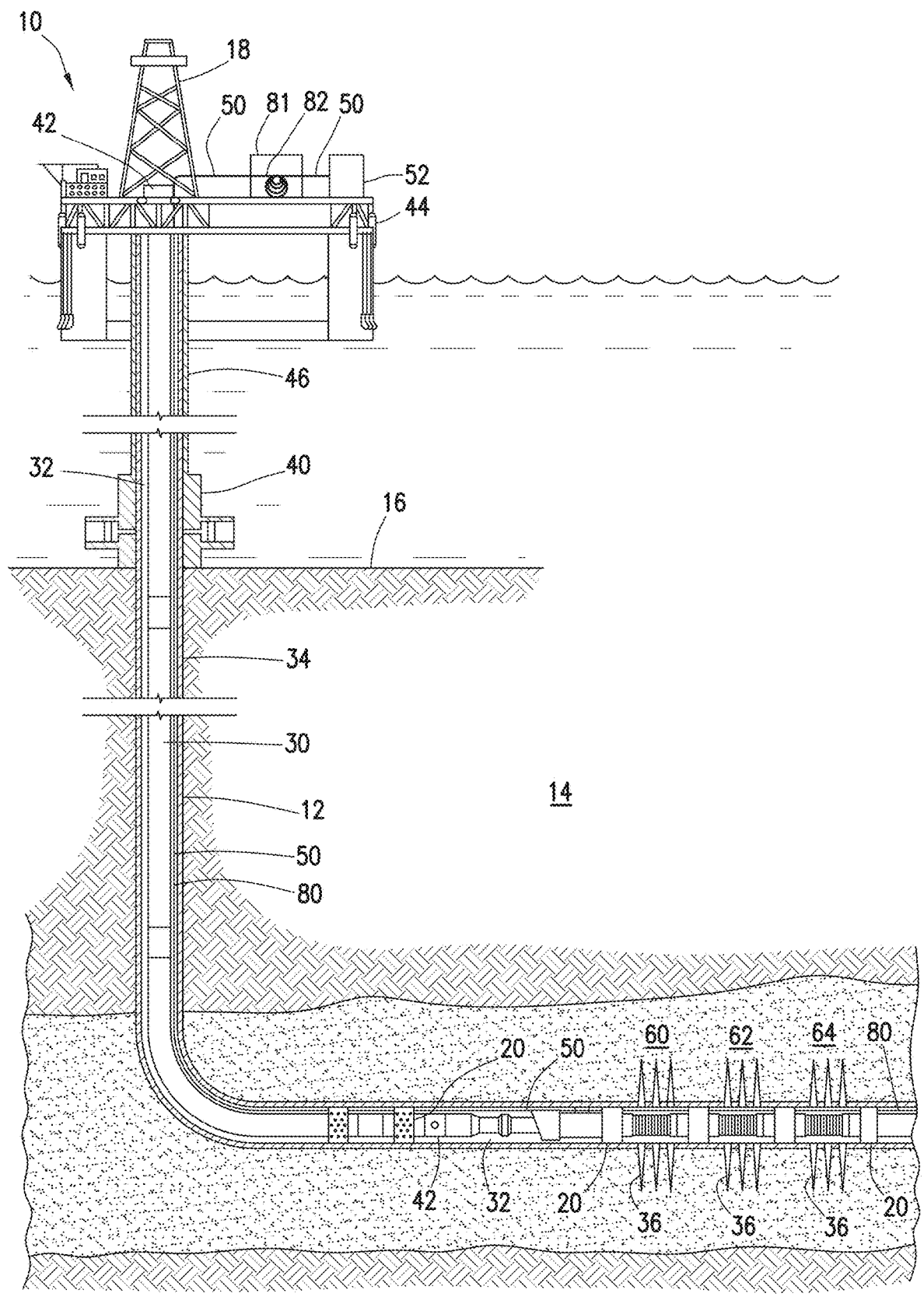
FIG. 1 is a representative partial cross-sectional view of a marine-based well system with a system that can detect changes in environmental conditions in the wellbore according to an embodiment.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those skilled in the art that the method and/or system according to the present disclosure is equally well suited for use in onshore operations and vice-versa. Further, unless otherwise noted, even though a Figure may depict a cased hole, it should be understood by those skilled in the art that the method and/or system according to the present disclosure is equally well suited for use in open hole operations.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. It should also be understood that, as used herein, "first," "second," and "third," are assigned arbitrarily and are merely intended to differentiate between two or more objects, etc., as the case may be, and does not indicate any sequence. Furthermore, it is to be understood that the mere use of the word "first" does not require that there be any "second," and the mere use of the word "second" does not require that there be any "first" or "third," etc.

The terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

Generally, this disclosure provides a method and system to detect small changes in downhole environmental conditions in a wellbore. For example, temperature changes on the order of 1 to 10 mK (millikelvin) and small strain changes can be detected. The system can include an optical waveguide with a reference and sensing portion, an optical light source coupled to the waveguide, and an optical receiver coupled to the waveguide. It is not required that the optical light source provide a signal with a precisely controlled frequency. The optical light source can be a standard type source which can produce an optical signal at a frequency that may drift over time. The optical waveguide (or at least the sensing portion) can be installed in a wellbore on a conveyance vehicle (e.g. tubing strings, slickline, wireline, etc.). The method and system of this disclosure can detect small changes in downhole environmental conditions because the optical waveguide's properties are sensitive to changes in the environmental conditions. The optical light source can be coupled to the sensing portion of the waveguide for launching light at a set frequency into the waveguide and the optical receiver can be coupled to the waveguide to receive backscattered light from the waveguide. Because of the response of the waveguide's properties to environmental changes, the backscattered light contains information about how the waveguide's properties were modified by the environment. Therefore, this backscattered light can be used to create one or more measurement traces that represent(s) a profile of an environmental condition along at least a portion of a length of the wellbore. The measurement trace(s) can be created by interference between backscattered light from different inherent scatterers within the waveguide.

When an environmental condition changes, the frequency of the optical light source can be adjusted to compensate for the change in the environmental condition. In other words, the measurement trace obtained when the waveguide "is not" subject to a given environmental condition can be recuperated by using light at a different frequency when the waveguide "is" subject to the given environmental condition. The frequency shift that compensates for the environmental condition change can be determined when a measurement trace at the adjusted frequency substantially correlates with a measurement trace obtained prior to the change of the environmental condition. When the measurement traces, which are taken before and after the environmental change, substantially match each other (i.e. have a high correlation value from 0.8-1.0), then the change in the environmental condition can be determined based on the difference between the optical frequencies used to produce the before and after traces for the sensing section of the waveguide. Unfortunately, some of the adjusted frequency can be due to a drift in the set frequency of the optical light source that has little to do with the environmental condition change. Therefore, the frequency adjustment needed to compensate for the environmental condition change can include two components. One component can be the frequency adjustment that is needed to compensate for the environmental condition change and the other component can be the frequency adjustment that is needed to compensate for the drift in the set frequency that occurred between when the before and after traces were taken.

A precision frequency optical light source can be used to minimize any frequency drift by tightly controlling the optical signal frequency, such as phase-locked frequencies, etc. However, a frequency drift can still occur, even with the intentional precise control of the optical output signal frequency. The component of the frequency adjustment due to the frequency shift can be determined by a reference portion of the waveguide being positioned in a controlled environment. The controlled environment can substantially prevent changes (or at least prevent fast changes) in the environmental conditions surrounding the reference portion. Therefore, the amount of frequency needed to compensate for the frequency drift can be determined based on traces produced for the reference portion of the waveguide, since the necessary adjustments in frequency to produce traces after the change event that correlate to before the event traces of the reference portion are due largely (if not solely) to a frequency shift of the light source, since the environmental conditions can be stabilized (or at least monitored) for the reference section. Therefore, the component of the frequency adjustment needed to compensate for the environmental change can be determined by subtracting the component of the frequency adjustment needed to compensate for the frequency drift from the total frequency adjustment. Accordingly, the condition change in the wellbore can be calculated based on the frequency adjustment needed to compensate for the environmental change. Furthermore, by determining the change in the environmental condition, other aspects of the fluid flowing in the wellbore may also be determined, such as fluid type, fluid composition, fluid flow rate, pressure drop between the formation and the wellbore, watercut, location(s) of production zone(s) in the wellbore, etc.

It should be understood that the sensing portion of the optical waveguide, light source, and backscattered light receiver of this disclosure can also be used to perform additional tasks such as detecting temperature profiles via a Distributed Temperature Sensing (DTS) system using backscattering techniques (e.g. Raman, Rayleigh, and/or Brillouin), detecting absolute pressure measurements downhole, detecting acoustic signals via Distributed Acoustic Sensing (DAS), transmitting command and control data to/from downhole equipment, transmitting collected sensor data and/or telemetry data to/from downhole equipment, etc. These tasks can be performed along with the method and system of the current disclosure.

Turning to FIG. 1, this figure shows an elevation view in partial cross-section of a wellbore production system 10 which can be utilized to produce hydrocarbons from wellbore 12. Wellbore 12 can extend through various earth strata in an earth formation 14 located below the earth's surface 16. Production system 10 can include a rig (or derrick) 18. The rig 18 can include a hoisting apparatus, a travel block, and a swivel (not shown) for raising and lowering casing, or other types of conveyance vehicles 30 such as drill pipe, coiled tubing, production tubing, and other types of pipe or tubing strings, such as wireline, slickline, and the like. In FIG. 1, the conveyance vehicle 30 is a substantially tubular, axially extending work string or production tubing, formed of a plurality of pipe joints coupled together end-to-end supporting a completion assembly as described below. However, it should be understood that the conveyance vehicle 30 can be any of the other suitable conveyance vehicles, such as those mentioned above. The conveyance vehicle 30 can include one or more packers 20 to prevent (or at least restrict) flow of production fluid through an annulus 32. However, packers 20 are not required.

The wellbore production system 10 in FIG. 1 is shown as an offshore system. A rig 18 may be mounted on an oil or gas platform, such as the offshore platform 44 as illustrated, and/or semi-submersibles, drill ships, and the like (not shown). One or more subsea conduits or risers 46 can extend from platform 44 to a subsea wellhead 40. The tubing string 30 can extend down from rig 18, through subsea conduits 46, through the wellhead 40, and into wellbore 12. However, the wellbore production system 10 can be an onshore wellbore system, in which case the conduits 46 may not be necessary.

Wellbore 12 may be formed of single or multiple bores, extending into the formation 14, and disposed in any orientation (e.g. vertical, inclined, horizontal, combinations of these, etc.). The wellbore production system 10 can also include multiple wellbores 12 with each wellbore 12 having single or multiple bores. The rig 18 may be spaced apart from a wellhead 40, as shown in FIG. 1, or proximate the wellhead 40, as can be the case for an onshore arrangement. One or more pressure control devices (such as a valve 42), blowout preventers (BOPs), and other equipment associated with drilling or producing a wellbore can also be provided in the system 10. The valve 42 can be a rotating control device proximate the rig 18. Alternatively, or in addition to, the valve 42 can be integrated in the tubing string 30 to control fluid flow into the tubing string 30 from an annulus 32, and/or controlling fluid flow through the tubing string 30 from upstream well screens.

Figure 3A:
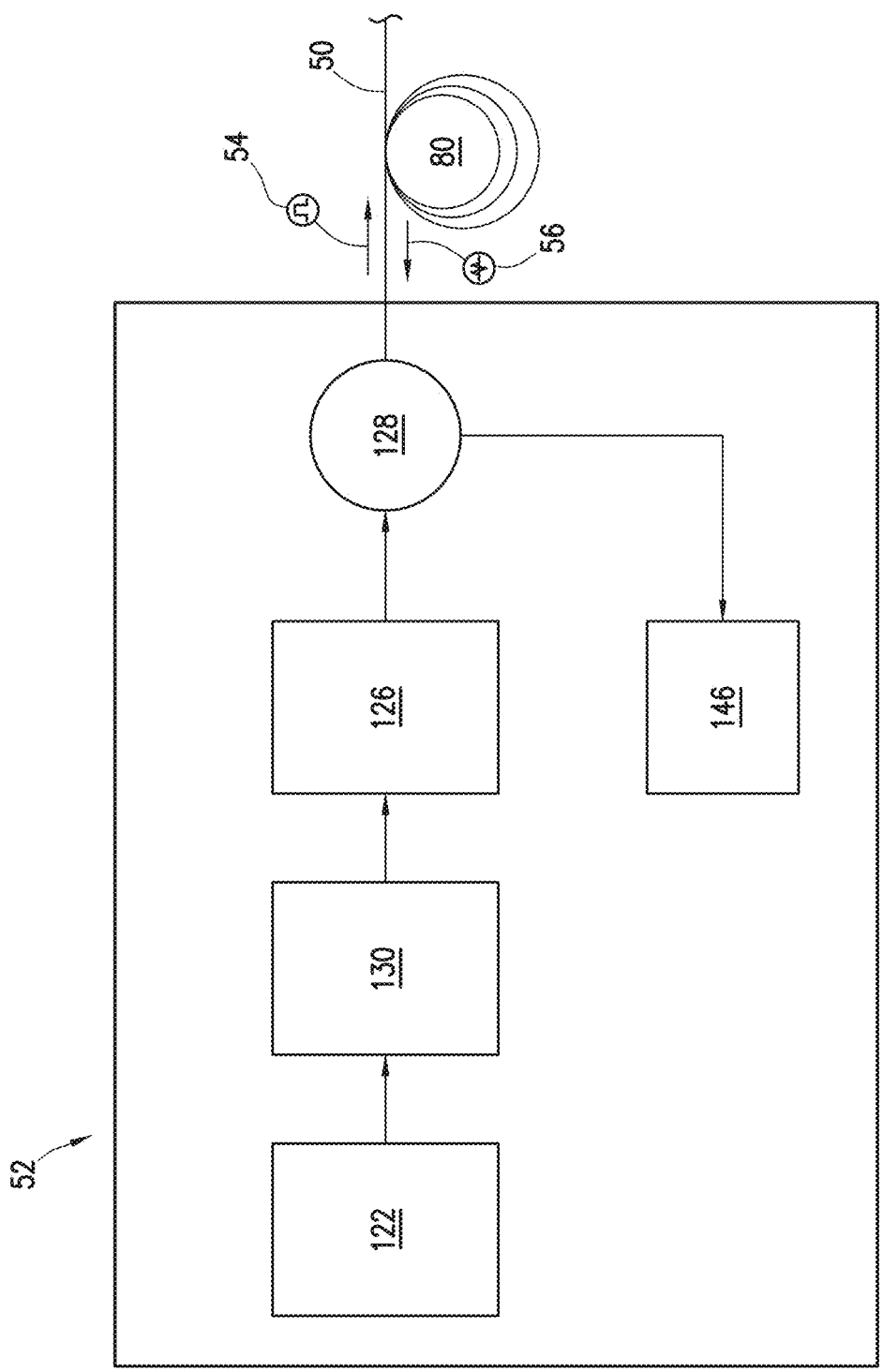
FIG. 3A is a representative block diagram of a Coherent Optical Time Domain Reflectometry (C-OTDR) device which can be coupled to an optical waveguide positioned along a wellbore in the well system.
Figure 3B:
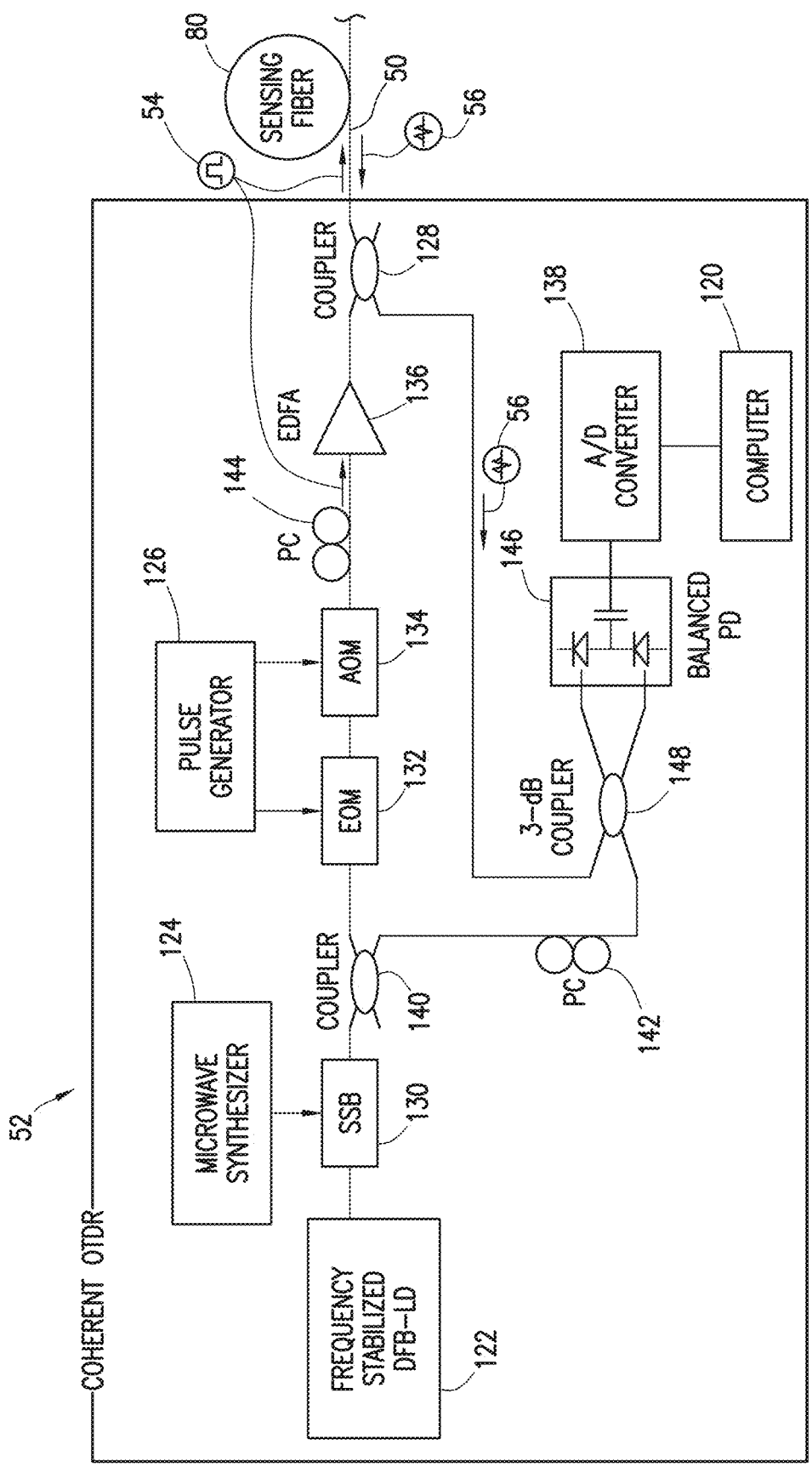
FIG. 3B is a representative block diagram of a device which can be coupled to an optical waveguide positioned along a wellbore in the well system.

An optical light source/receiver device 52 can be coupled to an optical waveguide 50 which can have a reference portion 82 and a sensing portion 80, with the sensing portion 80 installed along the tubing string 30 in the wellbore 12 (see FIGS. 3A, 3B, 12A, 12B for configuration examples). The reference portion 82 can be contained within a controlled (or stable) environment 81. The reference portion 82 can be connected in series with the sensing portion 80, but they can also be connected in parallel with each other. Also, it is not a requirement that the reference portion 82 be used at all. In this configuration, the light source 52 can be coupled directly to the sensing portion 80 of the waveguide 50. The optical light source/receiver 52 can be a device known as a Coherent-Optical Time Domain Reflectometry (C-OTDR) device, a Coherent-Optical Frequency Domain Reflectometry (C-OFDR) device, or any other suitable device for launching light into the optical waveguide at a selectable frequency and receiving backscattered light from the waveguide (e.g. Rayleigh backscattering). As used herein, the terms "substantially constant frequency" and "stable frequency" refer to a frequency of the optical light source 122 that may vary up to +/−10 MHz long term. Frequencies that remain within this tolerance are seen as being "substantially constant" and/or "stable." Frequencies that vary outside of this tolerance are referred to herein as being a "standard" optical frequency, where the optical source is settable to a frequency, and the optical source allows the output frequency to drift greater than +/−10 MHz long term. A representative block diagram of a device 52 is shown in FIGS. 3A and 3B. It should be understood that the device 52 can include more or fewer components than the components shown in FIG. 3A or 3B. These components can be incorporated into a single chassis, or one or more of these components can be housed in one or more separate chasses and coupled together to perform the functions of the device 52. The device 52 can provide an optical pulsed signal 54 at a settable frequency which is coupled to the optical waveguide 50. As the optical signal 54 travels through the optical waveguide 50, backscattered light 56 is returned to the device 52, which detects the received backscattered light, records an intensity of the backscattered light 56 vs. time, and creates a trace that represents the intensity of the backscattered light 56 received from points along a length of the optical waveguide 50 and therefore, along a length of the wellbore 12.

The sensing portion 80 of the optical waveguide 50 is shown in FIG. 1 extending through the annulus 32 along the tubing string 30, and past production zones 60, 62, 64. It should be understood that the sensing portion 80 is not required to be positioned in the annulus 32. It can be otherwise positioned, such as within the tubing string 30, attached to a casing string 34, and deployed in the wellbore 12 via various other conveyance vehicles (e.g. coiled tubing, wireline, slickline, etc.). FIG. 1 also shows three production zones 60, 62, 64, but any number of production zones can be supported by the method and system of this disclosure. If a location of the production zones 60, 62, 64 along the wellbore is unknown, then the location(s) can be determined by sensing a change in an environmental condition (such as temperature, pressure, etc.) in the fluid when the fluid flows (or is prevented from flowing) from the formation 14 into the wellbore 12. If the location along the wellbore of each production zone 60, 62, 64 is known (e.g. a wellbore with known locations of perforations 36 created at each of the production zones 60, 62, 64), then a portion of the length of the wellbore 12 to be evaluated can be localized to the known perforation zones, and evaluation times can be minimized. However, it is not required that the evaluation times be minimized.

Figure 2:
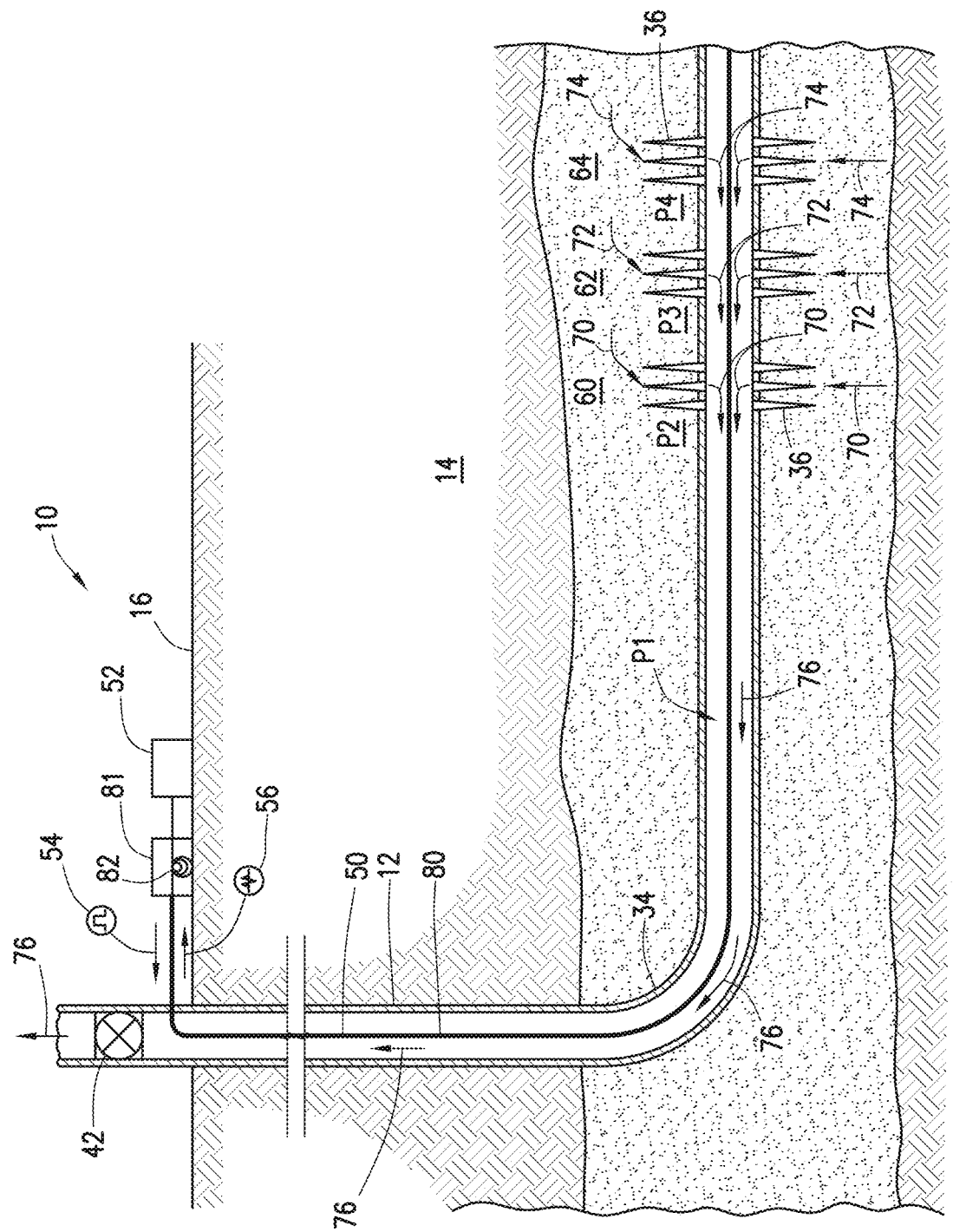
FIG. 2 is a representative partial cross-sectional view of a portion of a land-based well system utilizing the environmental condition detection system with an optical waveguide positioned in the wellbore.

FIG. 2 shows the production system 10 as a land-based (onshore) system 10, with the rig 18 and tubing string 30 not shown for clarity. The wellbore 12 has penetrated the earth formation 14 and has a horizontal portion. Perforations 36 have been created at each of the production zones 60, 62, 64. The production zones 60, 62, 64 can be located within a single producing zone, and/or located within separate producing zones of the formation 14. Fluids 70, 72, 74 can flow from respective production zones 60, 62, 64 into the wellbore 12 via the perforations 36. The fluid 74 can comingle in the wellbore 12 with the fluid 72, and the mixture of fluids 72, 74 can comingle in the wellbore 12 with the fluid 70 to produce the fluid 76 which can be produced through the wellbore 12 to the surface through valve 42. The fluids 70, 72, 74, 76 can be liquid, gas, a composition of various liquids, a composition of various gases, combinations of these, etc. When the valve 42 is closed, flow from the production zones 60, 62, 64 can be prevented (or at least significantly restricted), thereby causing pressures P1, P2, P3, P4 to equalize. If some pressure variations are present between the pressures P2, P3, P4, then some fluid may flow between the production zones, but it is preferable that fluid flow between production zones is minimized. With flow through the wellbore prevented (or minimized), a profile of the environmental condition along the wellbore can stabilize to a steady state condition. It should be understood that the valve 42 can be positioned at an end of a tubing string 30 and positioned further downhole than the production zones 60, 62, 64. If a production tubing string 30 is used in the wellbore 12 as shown in FIG. 1, the fluids 70, 72, 74 flowing into the wellbore 12 from the formation 14 can initially flow further downhole before flowing through the valve 42 as fluid 76 and into the production tubing string 30, which can carry the fluid 76 to the surface or to any other desired location. Therefore, fluid 70 can flow downhole to comingle with fluid 72 in the annulus 32, and the resulting fluid mixture can flow further downhole to comingle with fluid 74 in the annulus, which can result in the fluid 76 (which can be a single fluid type or a composition of fluid types) flowing in the annulus 32, through the valve 42, and into the production tubing string 30.

The device 52 and optical waveguide 50 (which can include portions 80, 82) can be used to collect baseline traces at one or more optical signal frequencies. The device 52 can launch an optical light signal 54 at a various frequencies into the waveguide and receive backscattered light signals 56 from the waveguide 50 (e.g. using Rayleigh backscattering). The device 52 can produce traces that represent an intensity of the backscattered light signals 56 along a distance of the waveguide 50. One of more baseline traces can be produced that are representative of an environmental condition (e.g. temperature, pressure, strain, etc.) in the wellbore 12 at one or more of the locations of the production zones 60, 62, 64, and/or other locations along the wellbore. There can be baseline traces produced for a length of both the reference and sensing portions 82, 80 of the waveguide 50. The device 52 can be a C-OTDR device.

FIG. 3A shows a representative block diagram of the device 52 that can be used to launch an optical signal 54 into the waveguide 50 and receive a backscattered signal 56 from the waveguide 50. For this configuration of the device 52, a simple frequency stabilized laser diode 122 can be used to supply an optical signal at a stable frequency to a single side band (SSB) modulator 130. Please note that the optical diode 122 can also produce standard frequency optical signals, without requiring a stable frequency in keeping with the principles of this disclosure. The frequency of the light source 122 can be adjusted by controlling a frequency shift at the SSB modulator 130. An example of commercial SSB modulator is the ModBox-CS-SSB-1550 from Photline Technologies (Besancon, France). The SSB modulator 130 sends the adjusted optical signal to the pulse generator 126 which creates a pulsed optical signal 54 that is launched into the waveguide 50 through a circulator 128. A backscattered light signal 56 is returned to the device 52 in response to the backscattering of the optical signal 54 by the optical waveguide. This backscattered light signal 56 can be received by the photo detector 146, and the device 52 can create a trace that represents the intensity of backscattered light along the waveguide 50. Instead of circulator 128, a fiber optic coupler (e.g., 3 dB directional coupler) can also be used. The device 52 can produce a trace that is a time resolved intensity of Rayleigh backscattering. The time delay after which a backscattered light is measured can correspond to a position in the fiber at which the backscattering occurred (due to the constant speed of light). The pattern of the backscattered light signals 56 can stay substantially the same over extended periods of time (hours to days or longer), if the environment in the wellbore remains constant. The backscattered light signals 56 can be very sensitive to variations in environmental conditions (such as temperature, pressure, strain, etc.) in the wellbore 12.

FIG. 3B shows another representative block diagram of components that can be used in a device 52. The C-OTDR device 52 can include a controller (or computer) 120 that controls the other components, transfers data to/from other components, receives inputs from an operator, and transmits results to the operator. An analog-to-digital converter 138 can interface the digitally based computer to a balanced photo-electric diode 146. Circulator 128 and couplers 140, 148 can route optical signals within the device 52. For example, coupler 148 can connect the optical signal from a light source 122 (e.g. a laser diode) to the balanced photo-electric diode 146. In this example, the light source 122 is a frequency stabilized distributed feedback laser diode (DFB-LD) emitting at optical frequency $v_0$. However, it should be understood, that this is only one possible laser source that can be used in keeping with the principles of this disclosure. Other suitable frequency stabilized laser diodes that provide a stable optical frequency can be utilized, as well as laser diodes that merely provide standard optical frequencies. The frequency of the output of the light source 122 can be precisely shifted by passing the output of the light source 122 into a single side band modulator (SSB) 130 that can be driven by a microwave synthesizer 124 (e.g., high speed function generator). The frequency of the light source 122 can be adjusted by controlling the frequency shift $\Delta v_{SSB}$ at the SSB modulator 130 to produce light at a new optical frequency $v=v_{laser}+\Delta v_{SSB}$. The resulting optical signal can be divided (via coupler 140) into two signals. One signal can be routed to the balanced photo diode 146 as a local oscillator signal, and the other signal can be passed through an electro-optic modulator (EOM) 132 and an acoustic optic modulator (AOM) 134 which can both be driven by a pulse generator 126. The output of the EOM 132 and AOM 134 components can provide a pulsed optical signal 54.

Polarization controllers 142, 144 can be used to optimize the signal strength at the balanced photo detector 146. The pulsed optical signal 54 can then be amplified (e.g. by an erbium-doped fiber amplifier (EDFA)) and launched into the waveguide 50. As a backscattered light signal 56 is received from the waveguide 50, the signal 56 can be combined at the coupler 148 with the local oscillator signal from the coupler 140 and then detected by the balanced photo diode (PD) receiver 146. The controller 120 can receive a digitized version of the detected signal and produce a representative trace of the signal 56 and transmit the trace to an operator, where the trace can represent the intensity of the backscattered light along at least a portion of the wellbore 12. The C-OTDR device 52 can also produce a trace that is a time resolved intensity of Rayleigh backscattering. Therefore, it is seen that several configurations of the device 52 can be used to support the principles of this disclosure.

Figure 4:
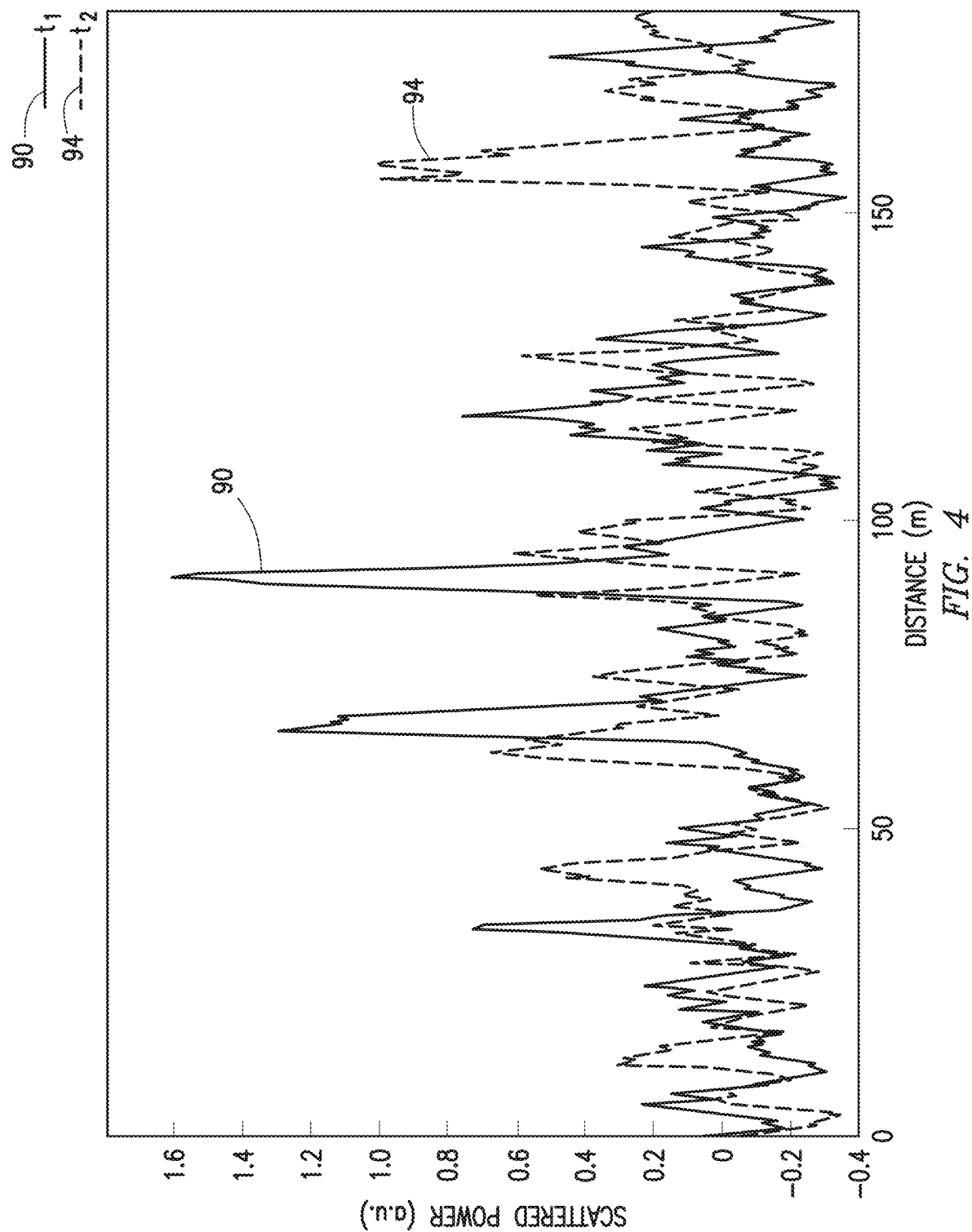
FIG. 4 illustrates a representative C-OTDR trace "t1" for the portion of the optical waveguide in the steady-state environment taken at an initial optical signal frequency and a representative C-OTDR trace "t2" for the portion of the optical waveguide at a changed environmental condition from the steady-state environment taken at the initial optical signal frequency.

FIG. 4 illustrates the sensitivity of the backscattered light signal 56 to small changes in temperature, with other environmental conditions in a steady-state. (Temperature is used here as an example of a changing environmental parameter, but it should be understood that other physical parameters of interest can also be monitored, such as pressure, or strain.) In this example, two traces 90, 94 have been produced in response to receiving two separate backscattered signals 56 from the sensing portion 80 of the waveguide 50 at two separate time periods. The trace 90 was collected initially at a first time period with the environment around the optical waveguide at about 303 degrees Kelvin, and with a SSB frequency shift ($\Delta v_{SSB}$) of the optical signal at 4.39 GHz. The trace 94 was collected a minute later at the same optical signal frequency, but at a slightly changed temperature. [Note: Because the optical frequency is adjusted by the change in the SSB modulation frequency, different values of SSB frequency correspond to different optical frequencies. For this reason, when it is desirable to indicate two different optical frequencies, two different values of SSB frequency ($\Delta v_{SSB}$) are quoted because, in practice, this is what can be changed to achieve the difference in optical frequency.] A temperature probe was used to monitor the environmental temperature around the sensing portion 80 of the waveguide 50 and the probe's measurements determined that the temperature had dropped 28 mK. As can be seen from FIG. 4, the two traces 90, 94 are quiet dissimilar indicating the sensitivity of backscattered light to very small changes in temperature. As will be discussed in more detail below, this change in an environmental condition (e.g. temperature in this example) can be compensated for by adjusting the optical signal frequency to produce a new trace that is substantially the same as the initial trace 90 (e.g. trace 96 in FIG. 5). When the before and after traces 90, 96 are substantially equal (to be defined in detail below in terms of cross-correlation value), the amount of frequency adjustment needed to produce a substantially equal trace 96 can be used to calculate (or determine) the change in the environmental condition.

If the environmental absolute temperature T is close to some initial temperature $T_0$; then this means that $T=T_0+\Delta T$ with $\Delta T \ll T_0$, where $\Delta T$ is a change in temperature from the initial temperature $T_0$ to the new temperature T. Similarly, if the optical signal frequency v of the laser light is close to some initial frequency $v_0$ ($=v_{laser}+\Delta v_{SSB_0}$), then this means $v=v_0+\Delta v$ with $\Delta v \ll v_0$, where $\Delta v$ is the change in frequency from the initial frequency $v_0$ to the final frequency v.

A correlation value Corr, can be used to indicate a correlation between two separate traces. If $A_1(n)$ is the first trace and $A_2(n)$ is the second trace (with n being the index for a specific data point, for example n=1 . . . 10000 if a total of N=10000 data points are measured), then the correlation between the two traces can be defined by equation (1), $$\text{Corr} = \frac{1}{N} \sum_{n=1}^{N} \frac{A_1(n) - \mu_{A_1}}{\sigma_{A_1}} \times \frac{A_2(n) - \mu_{A_2}}{\sigma_{A_2}} \quad (1)$$

where $$\mu_{A_1} = \frac{1}{N} \sum_{n=1}^{N} A_1(n)$$

is the mean of $A_1(n)$, and $$\sigma_{A_1} = \sqrt{\frac{1}{N} \sum_{n=1}^{N} (A_1(n) - \mu_{A_1})^2}$$

is its standard deviation, and likewise for $\mu_{A_2}$ and $\sigma_{A_2}$. If the correlation value Corr equals "1" (one), the two signals are seen to be identical to each other (or the highest correlation). If the correlation value Corr equals "0" (zero), then the two signals are seen to have nothing in common (or minimal correlation). Correlation values Corr that have a magnitude between "1" and "0" indicate that the two signals at least partially correlate to each other, with values closer to "1" indicating a higher correlation and values closer to "0" indicating a lower correlation.

In an approximation, for the case of the environmental perturbation affecting only temperature, the trace can depend only on a distance d and a quantity $\delta$, where $$\delta = \Delta T + 0.75 \frac{mK}{MHz} \Delta v.$$

Therefore, this indicates that if the temperature changes, the frequency can be fine-tuned afterwards until the quantity δ becomes zero in which case the trace can be substantially equal to the initial trace. In the case where the first and second traces $A_1(n)$, $A_2(n)$ have a correlation value that is close to "1," then the first and second traces may be seen as being substantially equal to each other. As used herein, a correlation value "Corr" that is greater than or equal to 0.80 indicates that the correlation is "close to 1" and that the two traces being correlated are substantially equal to each other. With the indication from the correlation value Corr that the two traces are substantially equal to each other, then the quantity δ may be assumed to be zero and the change in temperature can be determined from the frequency change in by solving for ΔT, which results in equation (2):

$$\Delta T = -0.75 \frac{mK}{MHz} \Delta v \qquad (2)$$

Therefore, the change in temperature can be calculated based on the change in frequency used to cause the second trace to have a correlation value in the range of 0.8 to 1.0 with the first trace. This example assumes that a strain on the fiber is substantially constant and does not change significantly during the determination of the change in temperature. Therefore, the portion of the change in frequency necessary to compensate for any change in strain of the optical waveguide is considered to be negligible for the purposes of calculating the change in temperature based on the change in frequency between the first and second traces. It should be noted, that the before and after traces refer to two traces that have a correlation Corr from 0.8 and 1.0. A plurality of traces can be collected at the initial and final environmental conditions, with each of the traces collected at the initial conditions correlated to each of the traces collected at the final conditions, thereby providing many independent measurements of the desired frequency shift.

Figure 5:
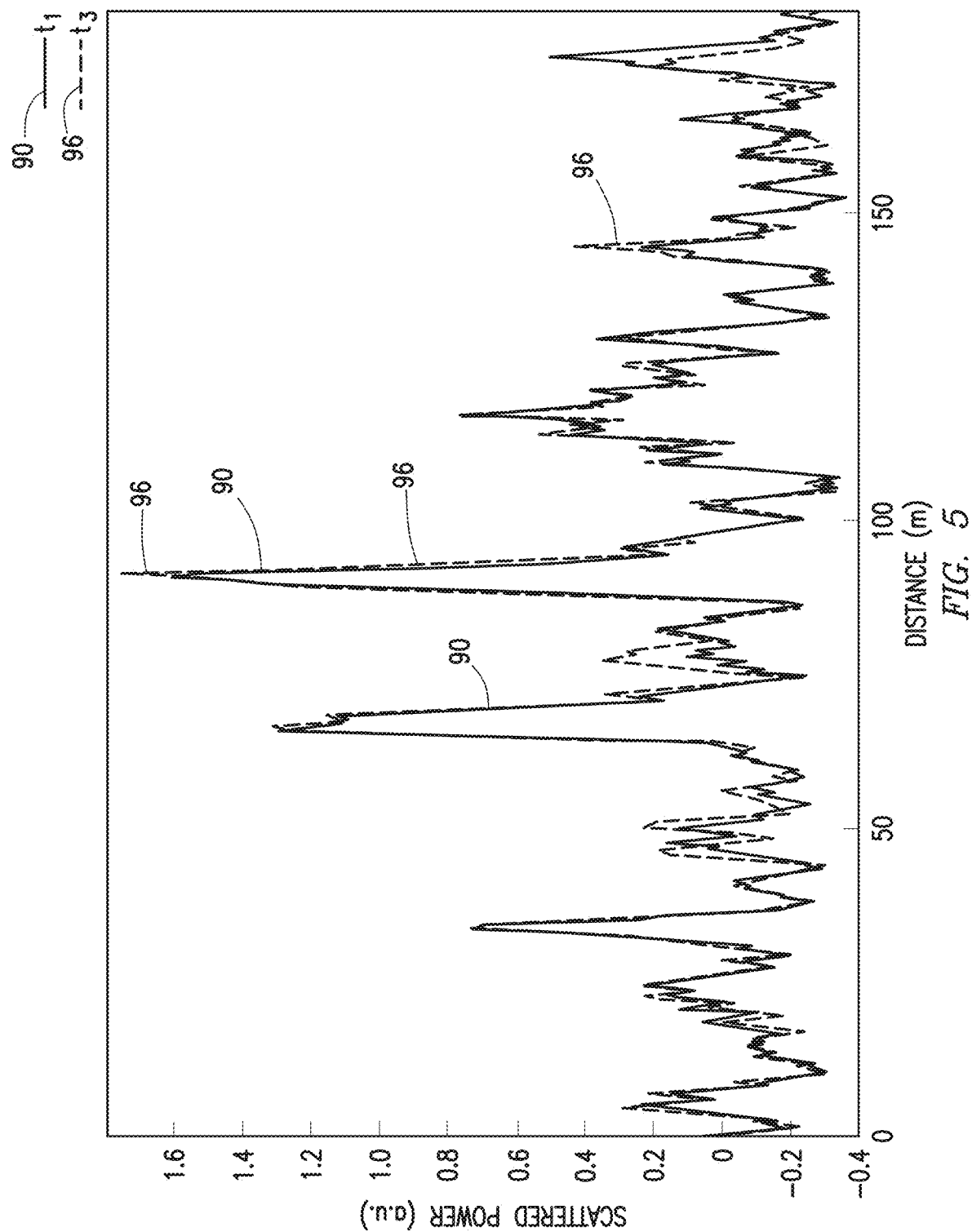
FIG. 5 illustrates the representative C-OTDR trace "t1" for the portion of the optical waveguide in the steady-state temperature environment taken at the initial optical signal frequency and a representative C-OTDR trace "t3" for the portion of the optical waveguide at a changed temperature taken at a changed optical signal frequency.

In the example above, traces 90, 94, a temperature shift of −28 mK caused a noticeable difference between the trace 90 produced prior to the temperature change during time period t1, and the trace 94 produced after the temperature change during time period t2. As per the discussion above, the frequency of the optical signal launched into the optical waveguide 50 from the device 52 can be fine-tuned to compensate for the change in the environmental temperature. FIG. 5 shows the trace 90 and a third trace 96, with the trace 96 being taken at a third time period t3, which was after the temperature shift of −28 mK, and with the optical signal frequency adjusted to 4.39 GHz (Δv=39 MHz). The two traces 90, 96 are substantially equal to each other, which indicate that the change in frequency has substantially compensated for the change in the environmental temperature. (This can also be illustrated by calculating the correlation Corr between the traces 90, 96 using equation (1) above.)

Therefore, the change in frequency can be used to calculate the change in the environmental temperature. Accordingly, equation (2) shows a calculation for ΔT based on the change in frequency. As equation (3) shows, the change in frequency of 39 MHz results in a calculated temperature change of 29 mK, which very closely approximates the actual temperature change of −28 mK measured by the temperature probe in this example.

$$\Delta T = 0.75 \frac{mK}{MHz} * 39 \text{ MHz} = 29 \, mK = \sim 28 \, mK \qquad (3)$$

By making similar measurements with the waveguide 50 positioned in a wellbore 12, a change in temperature in a liquid at each of the production zones 60, 62, 64, can be calculated by determining the change in frequency of the optical signal that respectively compensates for the amount of change in the environmental temperature at each of the production zones 60, 62, 64 as fluid flows from the formation 14 into the wellbore 12.

A change in strain of the fiber can be similarly calculated from a change in frequency, assuming the temperature remains constant during the measurements to determine the strain change. Much like the process for determining a change in temperature, the change in strain can have a linear relationship with the change in frequency of the optical signal 54 which is launched into the waveguide 50. The change in the strain can be calculated when two traces taken at different optical signal frequencies (one taken before the strain change and one taken after the strain change) have a correlation value Corr between 0.8 to 1.0. The difference in the optical signal frequencies can be used to calculate the change in the strain. The laser frequency change Δv that compensates for the strain change Δε is given by equation (4):

$$\frac{\Delta v}{v_0} \approx -0.78 \times \Delta \varepsilon \qquad (4)$$

Solving for Δε yields equation (5):

$$\Delta \varepsilon \approx -1.28 \times \frac{\Delta v}{v_0} \qquad (5)$$

Figure 6:
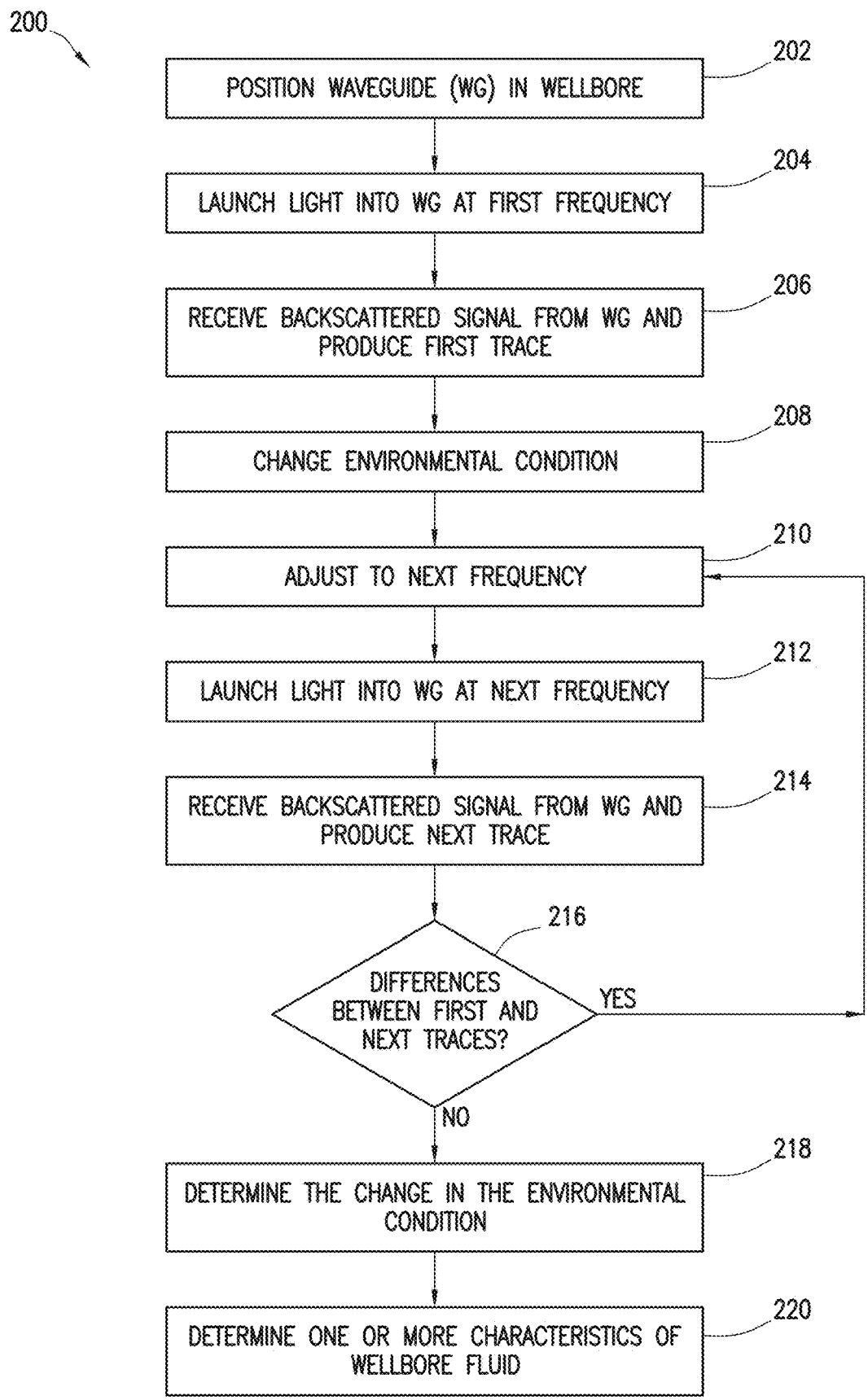
FIG. 6 illustrates a representative block diagram of a method for detecting changes in an environmental condition in the wellbore.

FIG. 6 shows a representative block diagram for a method 200 which can be used to detect changes in an environmental condition(s) (e.g. temperature, pressure, strain, etc.) along a wellbore. The method 200 can include the steps 202-220 as shown, but the method 200 can also include more or fewer steps than those shown in FIG. 6. In step 202, an optical waveguide 50 can be positioned along a wellbore 12 via one of various conveyance vehicles 30 as given above. A light source 122 (which can be included in the device 52, see FIGS. 3A, 3B) can be coupled to the optical waveguide 50 in step 204 and can introduce (or launch) an optical signal 54 at a first frequency into the waveguide 50 during a first time period. The first time period can be the amount of time needed for the optical signal 54 to travel through the waveguide 50 to reach a desired location(s) in the wellbore 12 and for the backscattered light signal 56 to be received by the device 52. Preferably, the desired location or locations are at least one of the productions zones 60, 62, 64. However, the desired location can be any location along the wellbore 12.

In step 206, a backscattered signal 56 can be received from the optical waveguide 50 in response to the introduction of the optical signal 54 during the first time period. A first trace can be produced that represents an intensity of the backscattered light along the waveguide 50 during the first time period. This first trace can also be seen as a baseline trace (i.e., a trace representing the initial conditions) that provides a baseline to which other traces are compared. It should also be noted that this first trace can include multiple traces at multiple different frequencies to provide a wide range of backscattered signals 56 with which to compare against future traces. It is not required that the first, initial, or baseline trace be a singular trace.

After the initial trace or traces are collected in step 206, the environmental condition(s) can be changed in step 208. There are many ways one or more of the environmental conditions downhole can be changed in keeping with the principles of the current disclosure. For example, opening or closing a valve 42 (see FIG. 2) can selectively permit and prevent fluid flow through the wellbore 12. By changing the fluid flow, environmental conditions (e.g. pressures, temperatures, strain, etc.) can be changed from an initial state to an altered state. The altered fluid flow can cause a change in the environmental condition by altering the Joule-Thompson effect. Operating the valve 42 can change a pressure differential between pressure P1 in the wellbore 12 and formation pressures P2, P3, P4 at the respective production zones 60, 62, 64. Initially, the valve 42 can be open to allow a fluid 76 to flow out of the wellbore 12, which can enable fluids 70, 72, 74 to flow into the wellbore from the formation 14. In this case, the Joule-Thompson effect can cause a temperature change in each of the fluids 70, 72, 74 as the fluids flow out of the formation 14 and in to the wellbore 12. With steady-state fluid flow, a profile of the environmental condition in the wellbore can reach a steady state condition. It is during this steady state condition that the initial trace(s) can be collected as in step 206.

If the valve 42 is then partially (or fully) closed, a backpressure from the closed valve 42 can cause pressure P1 in the wellbore to equalize with pressures P2, P3, P4 in the formation 14 at the respective production zones 60, 62, 64. Equalizing these pressures, reduces (or eliminates) the flow of the fluids 70, 72, 74 into the wellbore 12. With reduced fluid flow, the Joule-Thompson effect in each of the fluids 70, 72, 74 is reduced (or eliminated), thereby allowing the temperatures of the fluids 70, 72, 74 to equalize with the temperatures of the formation 14 at the respective production zones 60, 62, 64. Equalizing the temperatures (and pressures) at the production zones 60, 62, 64, can cause a change in temperature of each of the fluids 70, 72, 74 by reduction and/or elimination of the Joule-Thompson effect in these fluids.

Alternatively, the environmental condition change can also be caused by having the valve 42 initially closed and then opening the valve 42 to permit fluid flow from the wellbore 12. With the valve 42 initially closed, flow of fluid 76 is prevented (or significantly restricted), thereby preventing (or significantly restricting) flow of fluids 70, 72, 74 from the formation 14 into the wellbore 12 at the production zones 60, 62, 64. Without a pressure drop between the production zones 60, 62, 64 and the formation 14, the temperatures and pressures at these zones can equalize with the formation 14 temperatures and pressures to provide a stable environmental condition profile along the wellbore 12. The initial trace(s) can be collected while the environmental conditions (e.g. temperature, pressure, strain, etc.) are stable and the valve 42 is closed. After collection of the initial trace(s), then the environmental condition can be changed by opening the valve 42. Opening the valve 42, can allow fluid 76 to flow through the wellbore 12, thereby creating a pressure differential in the fluids 70, 72, 74 at the respective production zones 60, 62, 64. The pressure differential in each of the fluids 70, 72, 74 can cause the temperature in the fluids to change due to the Joule-Thompson effect.

Once the environmental change has occurred, a next trace can be collected by adjusting the frequency of the light source 122 to a next frequency in step 210 that is different from the first frequency, introducing an optical signal 54 from the light source 122 into the optical waveguide 50 at the next frequency during a next time period in step 212, and receiving a next backscattered signal 56 from the optical waveguide 50 in response to the introduction of the optical signal 54 during the next time period in step 214. The next trace, which represents an intensity of the next backscattered signal 56 along the waveguide 50 during the next time period, can be produced and transmitted to the controller 60 for analysis. The initial (or first) and next (or second) traces can be compared in step 216 to determine if there are any differences between them. This comparison can be performed by calculating the correlation value (i.e. Corr) between the initial and next traces and determining if the resulting correlation value is within an acceptable range. As given above, if the correlation value is within a range from 0.8 to 1.0, then the signals can be deemed as being substantially the same. The steps 210, 212, 214, 216 can be repeated as many times as needed to produce a next (or second) trace that is substantially equal to the initial (or first) trace. In other words, the next frequency can be adjusted (step 210), the next trace collected for the adjusted frequency (steps 212, 214), and the next (or second) trace compared to the first trace (step 216) as many times as desired to produce a next trace that is substantially the same as the first trace (or at least substantially the same as one or more of the first traces). Additionally, the next trace can also include multiple traces, where, in step 216, one of the first traces can be compared to one or more of the next traces until one or more of the first traces is deemed to be substantially equal one or more of the next traces.

When step 216 determines that at least one initial trace is substantially equal to at least one next trace, then the difference between the frequency of the substantially equal initial and next traces can be used to calculate the change in the environmental condition in step 218, such as using equation (2) to calculate a change in temperature, and/or equation (5) above to calculate a change in strain. When the change in the environmental condition has been determined, then one or more fluid characteristics (such as fluid type, fluid composition, fluid flow, fluid pressure differential, etc.) can be determined based on the environmental condition change. For example, if temperature is the environmental condition that changed at a wellbore location during step 208, a strain of the waveguide 50 remains substantially constant, the wellbore volumes at the location are known, and wellbore and formation pressures at the location are known, then the temperature change determined in step 218 can be used to determine an effective Joule-Thompson coefficient for the fluid flowing into the wellbore at the wellbore location. The effective Joule-Thompson coefficient can be used to determine a composition of the fluid flowing into the wellbore 12 at the location, or fluid flow rate (if fluid composition is known), etc. If an actual Joule-Thompson coefficient of the fluid composition is known, then one or more of the other characteristics (such as fluid pressure differential, fluid flow rate, change in strain, etc.) can be determined based on the difference between the frequency of the initial trace and the next trace which has sufficient correlation.

There are several approaches for collecting initial and next traces to identify a change in an environmental condition in the wellbore 12. One example of an approach can be to measure one initial trace at a single frequency, change the flow rate, and then measure multiple traces at many different frequencies. The initial trace can then be compared to each one of the multiple traces to identify which one (or more) of the multiple traces correlate best with the initial trace. The difference in frequency between the initial trace and the one (or more) of the multiple traces, which best correlate, can be used to calculate the change in the environmental condition.

As way of another example, many initial traces at multiple different frequencies can be collected prior to a change in the environmental condition, after which the environmental condition can be changed, and then one final trace at one single frequency can be measured. Each of the initial traces can be compared to the final trace to determine which one or more of the initial traces correlate with the final trace. The difference in frequency between the one or more of the initial traces and the final trace can be used to calculate the change in the environmental condition.

As way of another example, one initial trace at one single frequency can be collected prior to a change in the environmental condition, after which the environmental condition can be changed, and then new traces can be continuously collected and compared to the initial trace as the optical signal frequency is slowly changed. When the comparison between the initial trace and one or more of the new traces identifies the new traces that best correlate to the initial trace, then the frequency difference between these initial and one or more new traces can be used to calculate the change in the environmental condition.

As way of yet another example, many initial traces at multiple different frequencies can be collected prior to the change in the environmental condition, after which the environmental condition can be changed, and many final traces at many different frequencies can be collected. Each of the initial traces can be compared to each one of the final traces to determine which one or more of the initial traces best correlate with one or more of the final traces. By plotting the result as a 2D color map, or a 2D shade level map (as done in FIG. 8), and fitting a line along the points of highest correlation, the frequency change necessary to cancel out the temperature change can be calculated and the frequency change can used to calculate the change in the environmental condition (this example approach is explained in more detail below regarding FIG. 8).

Figure 7A:
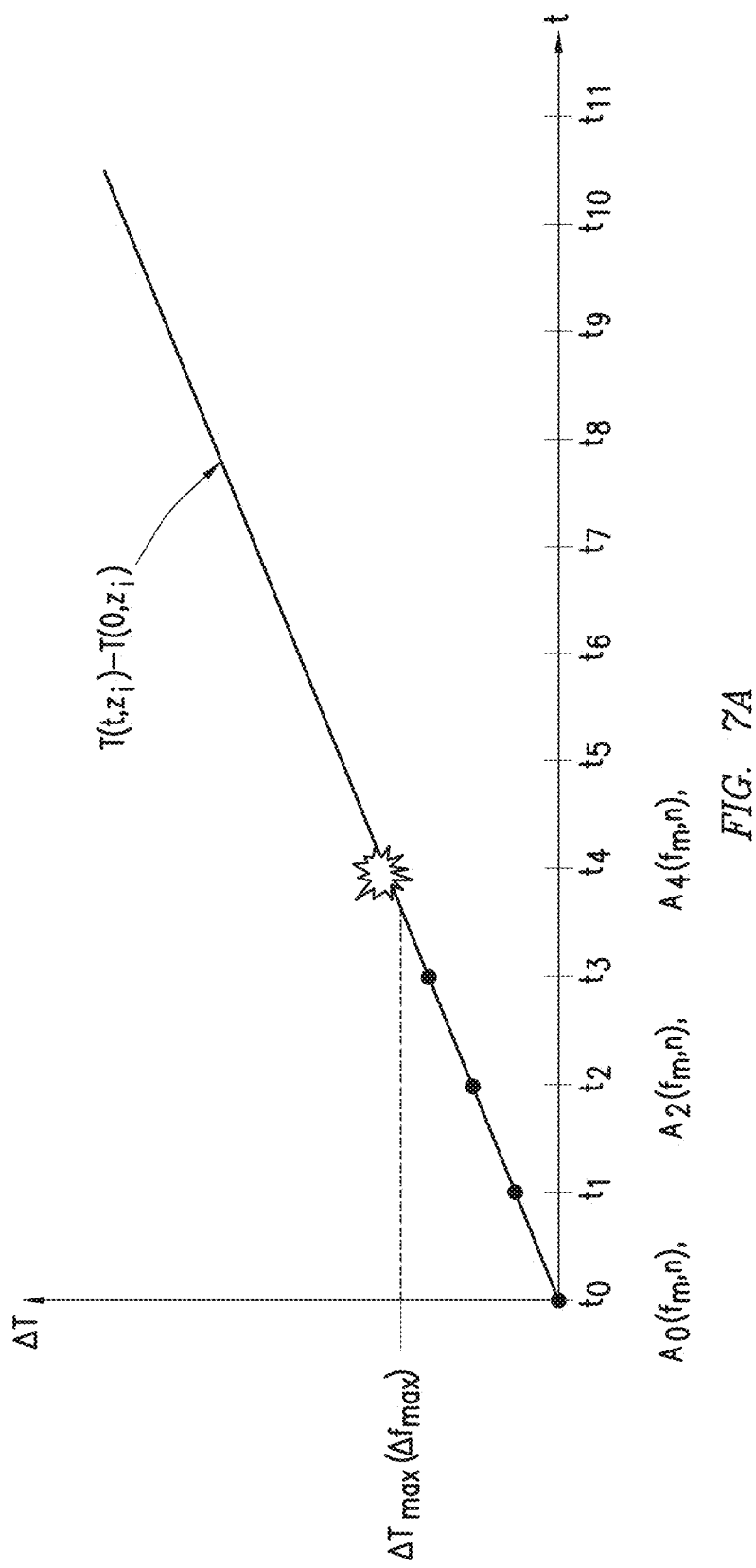
FIG. 7A illustrates a plot of traces collected over time to track large changes in temperature.

As way of yet another example, FIG. 7A shows a plot that represents temperature changes that may progress over time to drift outside of a frequency span S of an instrument (i.e. device 52) during the environmental change event. Times $t_1$ and $t_2$ represent start times for any two sets of before and after traces, with one or more before traces (i.e. traces taken before the change event) taken at time $t_1$, and a first set of one or more after traces (i.e. traces taken after the change event has begun) taken at time $t_2$. A frequency shift $\Delta f$ can be determined, as described above, by correlation of the before and after traces to identify the pair of traces with the best correlation and using those signals to determine $\Delta f$. However, this assumes that the amount of temperature change that occurs between the start of the change event to the end of the change event does not correspond to frequency shifts beyond the capability of the device 52. Method 300 (see FIG. 7B) is directed to the times this assumption is not valid and the amount of temperature change that occurs between the start of the change event and the end of the change event does correspond to frequency shifts beyond the capability of the device 52.

FIG. 7A illustrates the evolution of temperature at point $z_i$ over time, starting from $t=t_0$. Because of the frequency span used, a maximum correlatable temperature shift may be limited to $\Delta T_{max}$, as shown. With $A_0$ ($f_m$,n) used as a set of one or more "before" traces, collected at $t=t_0$, the peak frequency shift can be determined for sets of after traces collected after the change event begins at times $t_1$, $t_2$ and $t_3$. However, without changing the frequency range of the device 52, if a set of "after" traces $A_4$ ($f_m$, n) were taken at time $t_4$, no correlation would be achievable with the baseline dataset $A_0$ ($f_m$, n). It would therefore be seemingly impossible to calculate the temperature change $\Delta T_{0 \rightarrow 4}$, between times $t_0$ and $t_4$ directly by the datasets $A_0(f_m, n)$, $A_4(f_m, n)$ collected at those two times. However, a dataset $A_2$ ($f_m$, n) collected at an intermediate time $t_2$ can be correlated to dataset $A_4(f_m, n)$, thereby permitting calculation of a temperature shift $\Delta T_{2 \rightarrow 4}$ that occurred at $z_i$ during time interval between times $t_2$ and $t_4$. The total temperature change $\Delta T_{0 \rightarrow 4}$ that occurred between times $t_0$ and $t_4$ can be calculated by summing the temperature change $\Delta T_{0 \rightarrow 2}$ between times $t_0$ and $t_2$ and the temperature change $\Delta T_{2 \rightarrow 4}$ between times $t_2$ and $t_4$. This process can also be similarly applied to determining changes in other environmental conditions, such as pressure and strain. (Again, please note that temperature is discussed above merely for purposes of discussion. This discussion can also similarly apply to other conditions such as pressure and strain.)

Therefore, as long as the time intervals between the datasets are short enough to ensure that an environmental condition change between two contiguous times can be correlated to determine a frequency shift, the incremental condition change between those contiguous points can be calculated and thus the overall condition change can be calculated. Because each condition increment is determined with a non-zero uncertainty, by adding up the condition increments to obtain the full condition change, a cumulative effect of the uncertainty can occur (following a standard propagation of errors for a sum of measurements). The uncertainties can be minimized by having a device 52 with a large frequency span (2S) and that datasets be collected at certain condition increments, so as to minimize the number of steps between the current condition shift measurement and the baseline condition.

Figure 7B:
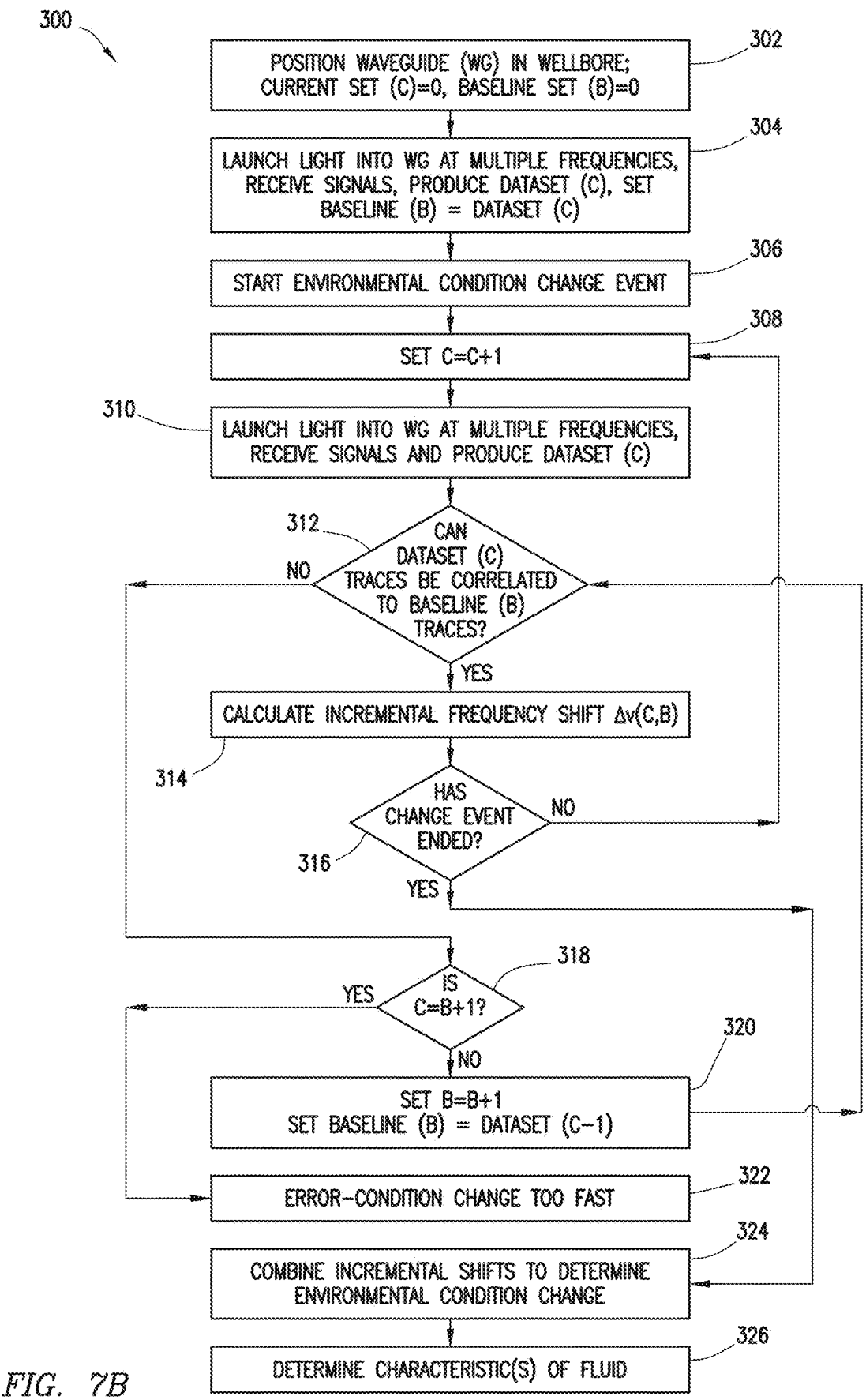
FIG. 7B illustrates a representative block diagram of a method for detecting large changes in an environmental condition in the wellbore.

FIG. 7B shows a representative block diagram for a method 300 corresponding to the discussion regarding FIG. 7A above. In step 302, a waveguide 50 can be positioned in the wellbore 12. A Current set counter (C) and a Baseline set counter (B) can be set to "0". Prior to the environmental condition changing, in step 304, light signals at multiple frequencies can be launched into the waveguide 50, thereby producing a Current Dataset (C) of traces from the respective backscattered signals 56 received from the waveguide 50. This Dataset (C) can be saved as a first Baseline Dataset (B), where B=C=0, initially. In step 306, the environmental condition change event can be initiated. It is assumed, for purposes of this discussion, that the change event will be a large change event as described above with regard to FIG. 7A. However, the method 300 also works for change events that are not large enough to require saving off multiple incremental baseline datasets of traces. In step 308, the Current counter (C) is set to C+1. In step 310, light signals at multiple frequencies can be launched into the waveguide 50, thereby producing an incremental Current Dataset (C) of traces from the respective backscattered signals 56 received from the waveguide 50. Therefore, for the first execution of step 310, the Current counter (C)=1, and the Baseline counter (B)=0. After the initial execution of step 310 these counters represent the incremental datasets used for the Current Dataset (C) and the Baseline Dataset (B).

In step 312, it is determined whether or not the traces in the Current Dataset (C) and the Baseline Dataset (B) can be correlated. Please note that the correlation of these two datasets can be performed as described in detail in this disclosure. If the traces in the Current Dataset (C) and the Baseline Dataset (B) can be correlated (i.e. YES), then the method 300 proceeds to step 314 where an incremental frequency shift Δv(C,B) can be determined and saved off for future calculations. The incremental shift Δ(C,B) refers to the shift between the Current Dataset (C) and the Baseline Dataset (B), where C and B change per the Current counter (C) and the Baseline counter (B) values. In step 316, it is determined whether or not the environmental condition change event has ended. If YES, then the method 300 proceeds to step 324, where all the incremental frequency shifts Δv(C,B) that were saved off in step 314 are combined (i.e. added together) to produce the total frequency shift between the Baseline Dataset (0) and the last Current Dataset (C). From this total frequency shift, the total environmental condition can be determined, and from that the fluid characteristic(s) can be determined, as described in detail in this disclosure.

If the answer in step 316 is NO, then the method 300 returns back to step 308, were C is incremented by 1 (i.e. C=C+1), and a new Current Dataset (C) is produced in step 310. Steps 308, 310, 312, 314, and 316 are repeated until the Current Dataset (C) cannot correlate to the Baseline Dataset (B) (i.e. NO in step 312), or the change event has ended (i.e. YES in step 316).

If the answer in step 312 is that the Current Dataset (C) cannot be correlated to the Baseline Dataset (B) (i.e. NO in step 312), then in step 318, it is determined whether or not the Current counter (C) is equal to the Baseline counter (B)+1. If YES, then an error has occurred because the environmental condition changes too fast during the change event. In this case, parameters will need to be adjusted to prevent this error and the method 300 reran. If the answer to step 318 is NO, then, in step 320, the Baseline counter (B) is incremented by "1" (i.e. B=B+1), and an incremental Baseline Dataset (B) is set equal to the Current Dataset (C−1) and saved off for future calculations. The method 300 then proceeds to step 312 to verify that the Current Dataset (C) can be correlated to the Baseline Dataset (B). If so, then the steps 314 and 316 can be repeated.

Figure 8:
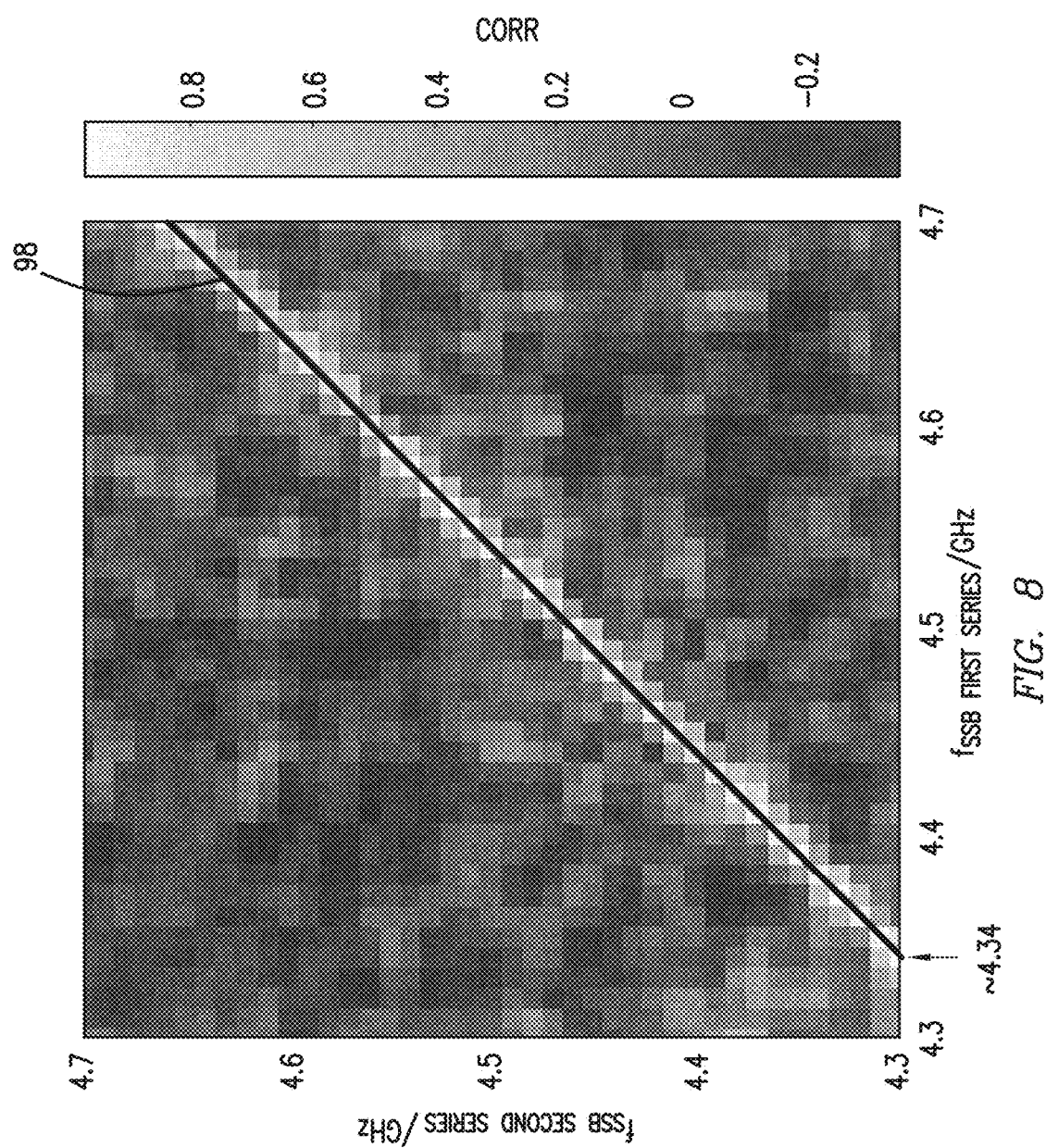
FIG. 8 illustrates a representative 2-axis shade level plot of a correlation value "Corr" and an array of compared traces which are collected at a range of initial and changed optical frequencies, as well as a line through high correlation values of the compared traces.

FIG. 8 represents a 3D plot of correlation values generated as a result of comparing a series of initial traces (collected at a first series of SSB frequencies), to a series of final traces (collected at a second series of SSB frequencies). For this example, a series of initial traces were collected for a range of optical signal frequencies from 4.30-4.70 GHz before the environmental condition was changed, and then a series of final traces were collected for a range of optical signal frequencies from 4.30-4.70 GHz after the environmental condition was changed. A correlation value was calculated for each pair of initial and final traces that were compared. A first correlation value was calculated when the initial trace corresponding to the signal frequency of 4.30 GHz was compared to the final trace corresponding to the signal frequency of 4.30 GHz and then the correlation value was plotted in the chart shown in FIG. 8 (lower left point). A next correlation value was calculated when the initial trace corresponding to the signal frequency of 4.30 GHz was compared to the final trace corresponding to the signal frequency of 4.31 GHz and then this correlation value was plotted. This process was continued until all initial traces were individually compared to each one of the final traces and the results plotted in the chart shown in FIG. 8. The key to the right in FIG. 8 defines the shading used to identify the weight of each correlation value in the plot. The lightest color indicates a high correlation value, while the darkest color indicates the lowest correlation value. A line 98 was drawn through the highest correlation values for each trace in the series and indicates that the change in frequency necessary to compensate for the change in the environmental condition was ~40 MHz. This corresponds to a change in the environmental condition, which was temperature in this example, of 30 mK as seen in equation (3) above.

The process of comparing the traces, calculating the correlation values, and identifying the best correlation values can be automated to provide expedited results. The following discussion describes various procedures for determining a pair of traces that have the best correlation out of an array of traces. Baseline data refers to traces collected before an event that changes an environmental condition, and subsequent data refers to traces collected after the event. Please note that the subsequent traces can also be collected while the condition is changing. These procedures and their examples focus on temperature as the environmental condition that changes between time period $t_1$ and time period $t_2$. However, other environmental conditions can be determined in a similar fashion. These procedures are only a few of possible procedures for determining the best correlation values between before and after traces.

A First Procedure:

The first procedure can be used for an approach that has baseline data collected at a single frequency, with subsequent data collected over a range of frequencies. This first procedure can be used to compare a baseline trace $A_1(f_{ref}, n)$ to a set of M traces $A_2(f_m, n)$, where the baseline trace $A_1(f_{ref}, n)$, is collected at frequency $f=f_{ref}$, having N elements (1≤n≤N), and can be representative of a C-OTDR pattern for the measurement that started at time period $t=t_1$. Please note that, in principle, index n is also representative of time, but at a much smaller scale (e.g. intervals less than 1 ns, typically) compared to measurement time intervals $\Delta t_{meas}$ of 1 minute or more between the datasets $A_1$ and $A_2$. Also note that baseline trace $A_1(f_{ref}, n)$ can be obtained from the average of several traces, all taken at $f=f_{ref}$ and over a time period from $t=t_1$ to $t=t_1+\Delta t_{meas}$.

The set of M traces $A_2(f_m, n)$, with (1≤m≤M), are each N elements long (1≤n≤N), and are collected starting at $t=t_2$. Please note that the trace for each frequency $f_m$ can also consist of an average of many traces, collected at the same frequency, so as to reduce the noise for the trace of that frequency. It is assumed that a range of frequencies can be chosen large enough to cover the effect of the largest temperature shift expected (or desired to be measurable) between $t_1$ and $t_2$. This range of frequencies $\{f_m\}$ can be chosen such that the reference frequency $f_{ref}$ is in the middle of the range, but it is not required for the reference frequency $f_{ref}$ be in the middle of the range.

For this first procedure, a vector of M cross-correlation can be calculated using equation (6):

$$y_{2,m} = \text{Corr}_{f_{ref},m} = \frac{1}{N} \sum_{n=1}^{N} \frac{A_1(f_{ref}, n) - \mu_{A_1,ref}}{\sigma_{A_1,ref}} \times \frac{A_2(f_m, n) - \mu_{A_2,m}}{\sigma_{A_2,m}} \quad (6)$$

with (1≤m≤M) and where $$\mu_{A_1,ref} = \frac{1}{N}\sum_{n=1}^{N} A_1(f_{ref}, n)$$

is the mean of $A_1(f_{ref}, n)$, and $$\sigma_{A_1,ref} = \sqrt{\frac{1}{N}\sum_{n=1}^{N}\left(A_1(f_{ref}, n) - \mu_{A_1,ref}\right)^2}$$

is its standard deviation. Likewise, for the data collected at $t=t_2$, there are M mean values $$\mu_{A_2,m} = \frac{1}{N}\sum_{n=1}^{N} A_2(f_m, n),$$

and M standard deviations $$\sigma_{A_2,m} = \sqrt{\frac{1}{N}\sum_{n=1}^{N}\left(A_2(f_m, n) - \mu_{A_2,m}\right)^2}.$$

Unless otherwise stated, the correlation function is calculated using the sum $$\frac{1}{N}\sum_{n=1}^{N}\ldots$$

which implies that all data points from 1 to N are part of a physical region of interest (i.e. the optical waveguide 50). If a smaller region of interest is desired, the sum can run only over points which are part of the region of interest.

The set of data points $(f_m, y_{2,m})$ can have a peak centered at frequency $f_{2,peak}$ which can be extracted using a standard peak finding algorithm. A simple way can be to select the frequency $f_m$ that corresponds to the highest value $y_{2,m}$. However, other peak finding algorithms can involve fitting a curve (e.g., a parabola) over the peak portion of the data and taking $f_{2,peak}$ as the location of the peak determined mathematically from the equation of the fitted curve. The offset can be given as $\Delta f_{1 \to 2} = f_{2,peak} - f_{ref}$. This procedure can be illustrated by the following example for the FIRST PROCEDURE.

An Example for the First Procedure

Figure 9:
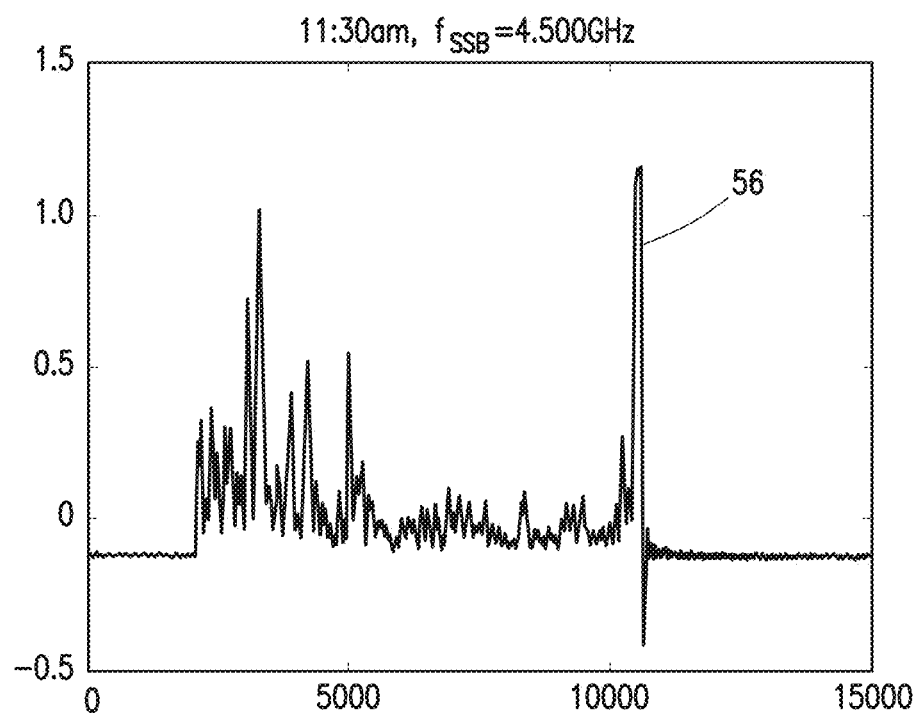
FIG. 9 illustrates a representative plot of an initial backscattered light signal collected an initial frequency at initial environmental conditions during a first time period.

Optical signals (e.g. laser pulses) can be introduced into the waveguide 50 and a backscattered signal 56 can be measured. During this initial measurement, the SSB modulation frequency can be set to 4.500 GHz. FIG. 9 shows a representative plot of the initial backscattered light signal 56. Referring to the equations of the first procedure above, this plot can be seen as $A_1(4.500$ GHz, n) where the index "1" indicates the signal 56 has been measured at the first time (11:30 am), 4.500 GHz is the SSB modulation frequency, and n=1 . . . 15000 is the number of the individual data points collected. The y-axis of the plot shows an intensity of the signal 56 (in arbitrary units). The x-axis can indicate time, shown here in units of data points. The acquisition rate for this example was $2 \times 10^9$ samples/s, therefore each point would correspond to 0.5 nanoseconds. This time scale can indicate a position at which the signal was scattered in the waveguide 50. The speed of light in a glass fiber can be around ⅔ of the speed of light in a vacuum, and scattered photons travel twice over the distance to the scattering site (back and forth), which can indicate that each point may correspond to around 5 centimeters. In this example, a region of interest includes the time from data point 7500 to data point 10300, which may correspond to a segment of the optical waveguide 50 that is approximately 140 meter long.

Figure 10A:
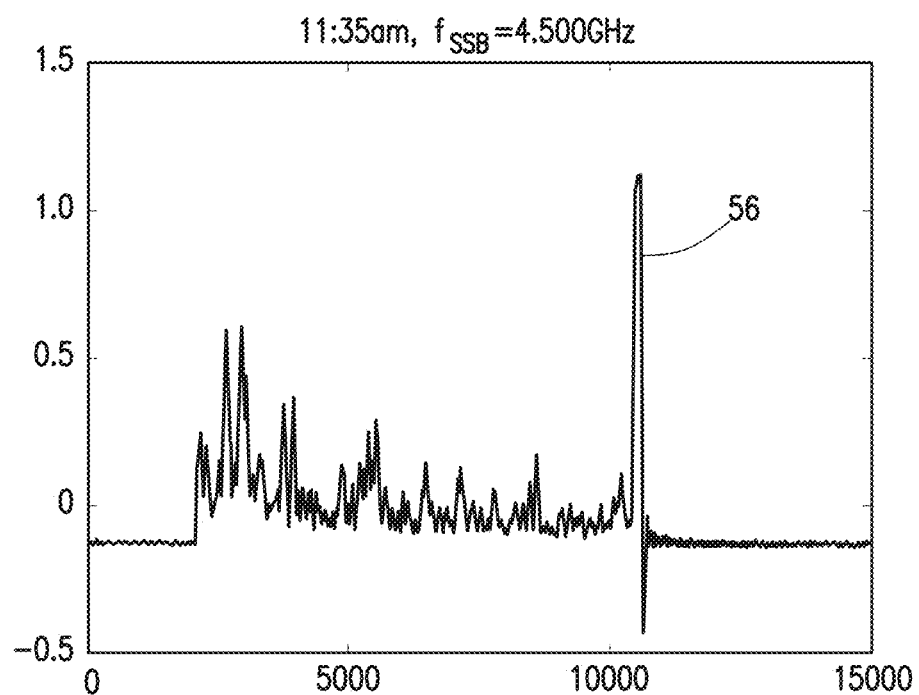
FIG. 10A illustrates a representative plot of a backscattered light signal collected at an initial frequency with changed environmental conditions during a second time period.
Figure 10B:
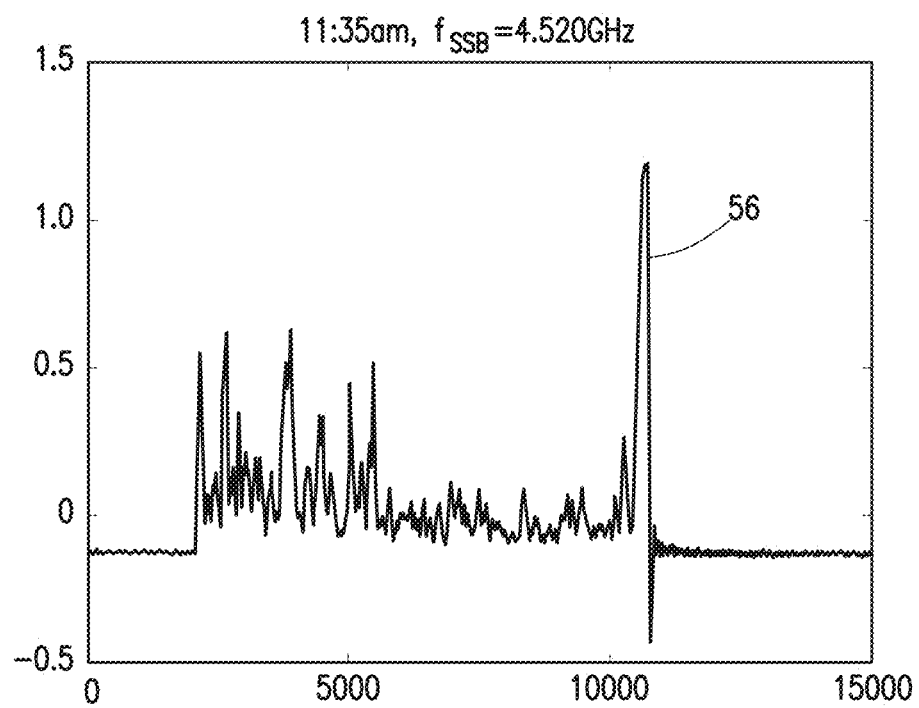
FIG. 10B illustrates a representative plot of a backscattered light signal collected at a second frequency with changed environmental conditions during the second time period.

After 5 minutes, multiple backscattered signals 56 were collected at many different SSB modulation frequencies. FIGS. 10A, 10B show two representative signals 56 collected at the same time interval, where $A_2(4.500$ GHz, n) and $A_2(4.520$ GHz, n) represents the two signals 56, the index 2 indicates that these signals 56 have been measured at the second time period (11:35 am), and the SSB frequency for each signal 56 was f=4.500 GHz and =4.520, respectively. It should be noted that many signals 56 at many more frequencies than these given here can be collected, but these two are representative of the multiple signals 56 that can be collected in keeping with the principles of this disclosure.

These signals $A_2(f_{SSB}, n)$ are then compared to the initial signal $A_1(4.500$ GHz, n) by calculating the correlation function. Equation (7) calculates the correlation value Corr between the region of interest (data point 7500 to data point 10300) of the initial trace measured at the first time and the region of interest of each of the traces recorded at the second time. Here, μ and σ represent the respective median and standard deviation.

$$\mathrm{Corr}(f_{SSB}) = \frac{1}{10300-7500}\sum_{n=7500}^{10300}\frac{A_1(4.500\text{ GHz}, n) - \mu_{A_1(4.500\,GHz,n)}}{\sigma_{A_1(4.500\,GHz,n)}} \times \frac{A_2(f_{SSB}, n) - \mu_{A_2(f_{SSB},n)}}{\sigma_{A_2(f_{SSB},n)}} \quad (7)$$

Figure 11:
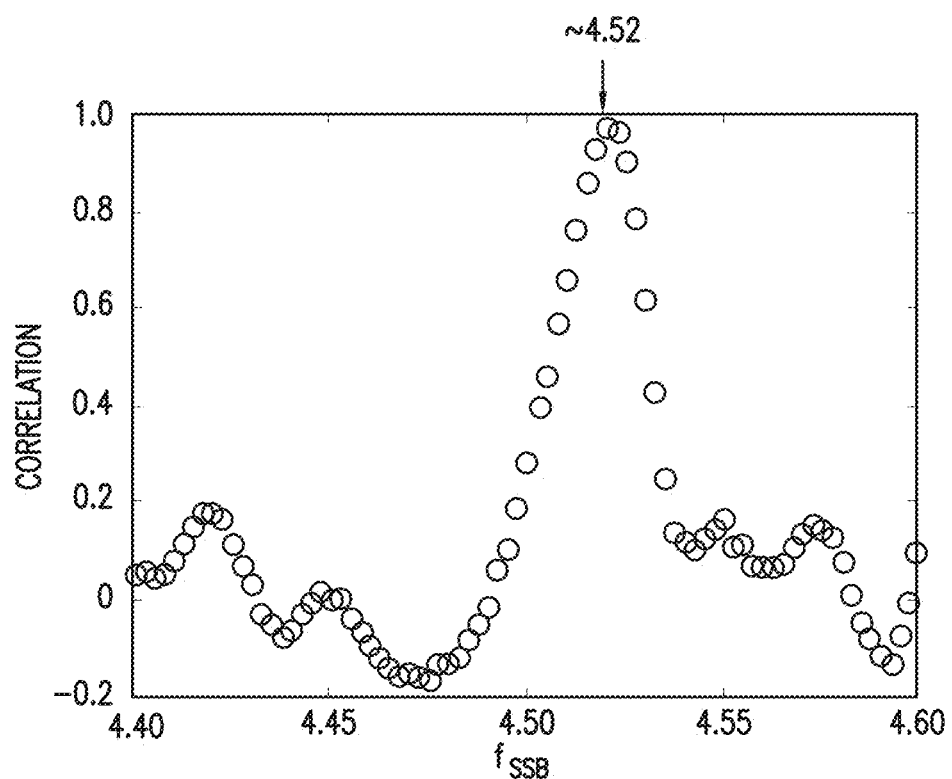
FIG. 11 illustrates a representative plot of correlation values for backscattered signals at frequencies from 4.4 GHz to 4.6 GHz.

As illustrated by the plot of correlation values vs. SSB frequencies shown in FIG. 11, the one with $f_{SSB}^{best}=4.520$ GHz appears to give the best correlation to the initial trace. Therefore, the temperature change experienced by the optical waveguide during the 5 minutes between the first time period to the second time period can be calculated using equation (2), where the change in frequency is ~20 MHz. Therefore, the change in temperature can be given by $$\Delta T = \sim 20\text{ MHz} \times 0.75\frac{mK}{MHz} = \sim 15\,mK.$$

A Second Procedure:

The second procedure can be used for an approach that has baseline data collected over a range of frequencies, with subsequent data also collected over a range of frequencies. This second procedure can be used to compare a set of P traces $A_1(f_p, n)$, to a set of M traces $A_2(f_m, n)$, where the P traces $A_1(f_p, n)$, are collected at a range of frequencies $f \in \{f_p\}$, having N elements ($1 \leq n \leq N$), and can be representative of C-OTDR patterns for the measurements that started at time period $t=t_1$. Please note, that the trace for each frequency $f_p$ can also consist of an average of many traces, to reduce the noise in the trace for each frequency.

As in the first procedure above, the set of M traces $A_2(f_m, n)$, with ($1 \leq m \leq M$), are each N elements long ($1 \leq n \leq N$), and are collected starting at $t=t_2$. Please note, that the trace for each frequency $f_m$ can also consist of an average of many traces. Again, it is assumed that a range of frequencies can be chosen large enough to cover the effect of the largest temperature shift expected (or desired to be measurable) between $t_1$ and $t_2$. This range can be chosen such that the reference frequency $f_{ref}$ is in the middle of the range, but it is not required for the reference frequency $f_{ref}$ be in the middle of the range.

For this second method, P vectors of M cross-correlation values can be regarded as a P×M matrix, and these values can be calculated using equation (8):

$$y_{2,p,m} = \text{Corr}_{f_p,m} = \frac{1}{N} \sum_{n=1}^{N} \frac{A_1(f_p, n) - \mu_{A_1,p}}{\sigma_{A_1,p}} \times \frac{A_2(f_m, n) - \mu_{A_2,m}}{\sigma_{A_2,m}} \quad (8)$$

For each p there is a corresponding curve made up of the points ($f_m$, $y_{2,p,m}$) and a location of the peak for each of these curves, expressed as $f_{2,p,peak}$, can be determined. Thus resulting in a set of P points ($f_p$, $f_{2,p,peak}$). Those points can describe a line: $f_{2,p,peak} = bf_p + a$. Therefore, the problem can be reduced to a standard linear regression problem with an offset given as $\Delta f_{1 \to 2} = a$. (Note that the experiment should yield b=1 and any deviation from this can be interpreted as due to error in the experiment and can be used as a data quality measure.) With the offset being the difference in frequency between a before trace and an after trace, and with the frequency difference, the change in temperature can be calculated as before.

A Third Procedure:

This third procedure incorporates elements that can make it more robust for automated processing because it incorporates quantitative data quality criteria. The third procedure can be used for an approach that has baseline data collected over a range of M frequencies $\{f_m\}$ and subsequent data collected over the same range of frequencies. This third procedure can be used to compare a first set of M traces $A_1(f_m, n)$ to a second set of M traces $A_2(f_m, n)$, where the first M traces $A_1(f_m, n)$ are collected at a range of frequencies $f \in \{f_m\}$, with ($1 \leq m \leq M$), and having N elements ($1 \leq n \leq N$), which can be representative of C-OTDR patterns for the measurements that started at time period $t=t_1$. Additionally, the second set of M traces $A_2(f_m, n)$ are collected at a range of frequencies $f \in \{f_m\}$, with ($1 \leq m \leq M$), and having N elements ($1 \leq n \leq N$), which are representative of C-OTDR patterns for measurements that started at time period $t=t_2$. Where the first and second set of M traces have a range of frequencies with a span $S = \max(f_m) - \min(f_m)$.

For this third procedure, M vectors of M cross-correlation values can be regarded as an M×M matrix, and these values can be calculated using equation (9):

$$\text{Corr}_{i,j} = \frac{1}{N} \sum_{n=1}^{N} \frac{A_1(f_i, n) - \mu_{A_1,i}}{\sigma_{A_1,i}} \times \frac{A_2(f_j, n) - \mu_{A_2,j}}{\sigma_{A_2,j}} \quad (9)$$

where ($1 \leq i \leq M$), $$\mu_{A_1,i} = \frac{1}{N} \sum_{n=1}^{N} A_1(f_i, n)$$

is the mean of $A_1(f_i, n)$ and $$\sigma_{A_1,i} = \sqrt{\frac{1}{N} \sum_{n=1}^{N} (A_1(f_i, n) - \mu_{A_1,i})^2}$$

is its standard deviation, and likewise for j, $\mu_{A_2,j}$ and $\sigma_{A_2,j}$. A range of frequency offsets $B_k$ in range $-S \leq B_k \leq S$ can be selected, where S is the frequency span defined above. There can be K such values ($1 \leq k \leq K$), with a uniform spacing of $$\left(\frac{2S}{K-1}\right).$$

A set of K quantities $Q_k$ are calculated using $Q_k = \Sigma_{m=1} \text{Corr}_{k,m}$ where $\text{Corr}_{k,m}$ is obtained via an interpolation process from the $\text{Corr}_{i,j}$ defined above. To understand how this interpolation is done, it should be understood that for each k value, there is a fixed offset $B_k$, such that, for each value of m, is also associated a frequency $f_k = +B_k$. Depending on the values of $f_m$, and of $B_k$, $f_k$ may fall inside or outside of the range of frequencies collected. If inside the range, $f_k$ may not fall on one of the values of $\{f_m\}$ in use, then select $f_j \in \{f_m\}$ such that $f_j \leq f_k$ and $f_{j+1} > f_k$, then $\text{Corr}_{k,m}$ is obtained using Equation (10):

$$\text{Corr}_{k,m} = \text{Corr}_{j,m} + \frac{(f_k - f_j)}{(f_{j+1} - f_j)} (\text{Corr}_{j+1,m} - \text{Corr}_{j,m}) \quad (10)$$

If $f_k$ falls outside of the range of frequencies collected, then set $\text{Corr}_{k,m} = 0$. If other words, $\text{Corr}_{k,m} = 0$ if $f_k < \min(f_m)$ or if $f_k > \max(f_m)$.

A normalized quality factor $\tilde{Q}_k$ can be calculated by dividing the quality factor $Q_k$ by the number of correlation values (however, excluding those which were set to zero because $f_k < \min(f_m)$ or $f_k > \max(f_m)$. In other words, $$\tilde{Q}_k = \frac{Q_k}{\sum_{k=1}^{K} w(k)}$$

with $w(k) = 1$ for $\min(f_m) < f_k < \max(f_m)$ and $w(k) = 0$ otherwise. A value k can be determined by determining which k value maximizes the quality factor $\tilde{Q}_k$. Additionally, the frequency shift which maximizes a correlation between before and after traces is given as $B_k$. From this, the temperature change which occurred between $t_1$ and $t_2$ can be expressed as $\Delta T = \alpha B_k$ where the quantity $$\alpha \approx -0.75 \frac{mK}{MHz}$$

as stated previously. Operationally, data quality measures can be implemented to verify a validity of the results. For example, the result could be rejected if $\tilde{Q}_k$ is less than a certain threshold (e.g. 0.7), or if $|B_{\tilde{k}}|$ is above a threshold (e.g. 0.8 S).

From these three procedures, it has been shown how the before and after traces having the best correlation to each other can be identified, even with each set of before and after traces including multiple traces. It should be understood that these are only a few of the procedures that can be used to determine the before and after traces with the best correlation values, and thereby determine a change in an environmental condition in a wellbore, where the environmental condition can be at least one of temperature, pressure, strain, etc.

The description given above for FIGS. 3A-11 is generally directed to determining an environmental change with a system configuration as given in FIG. 3A. This configuration launches an optical signal into the waveguide 50, which mostly includes only the sensing portion 80. The sensing portion 80 can be positioned in the wellbore to detect changes in the environmental conditions, but as stated previously, the frequency adjustments needed to compensate for changes in the before and after traces can include a portion that is due to a frequency shift in the optical light source 52, 122. The portion that is due to the frequency shift can cause an error in the determination of the value of the environmental condition change based on correlation of the before and after traces. This is why a precision frequency optical light source 52, 122 may be desired with the configuration of FIG. 3A. However, the portion due to the frequency shift can be determined using the system configurations shown in FIGS. 12A and 12B, and the portion can be removed from the final results to produce a closer approximation of a true value for the environmental condition change.

Figure 12A:
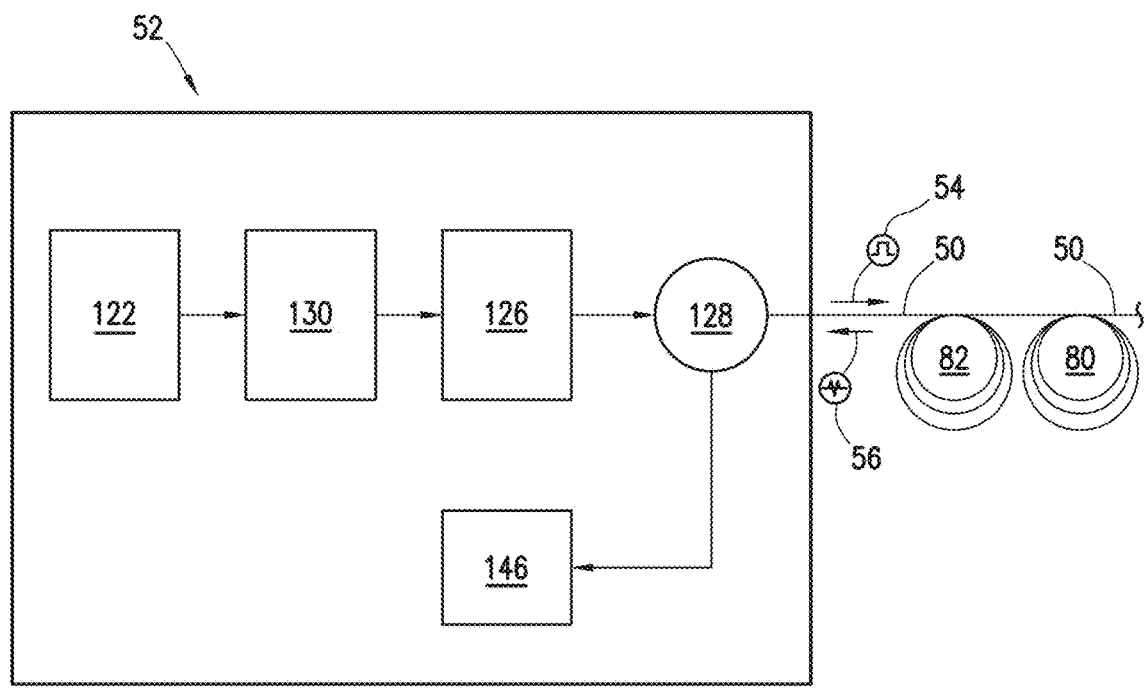
FIG. 12A is a representative block diagram of a configuration for coupling the device of FIG. 3B to an optical waveguide positioned along a wellbore in the well system, where the waveguide has a reference section and a sensing section.

FIG. 12A shows a device 52 coupled to a waveguide 50 which can have a sensing portion 80 and a reference portion 82. The sensing portion 80 can be installed in the wellbore 12 to provide measurements of environmental conditions in the wellbore 12. The reference portion 82 can be installed in a controlled environment 81 (see FIGS. 1 and 2) separate from the wellbore (and/or a controlled environment 81 within the wellbore 12) where the environmental conditions surrounding the reference portion 82 in the environment 81 remain substantially constant and/or the environmental condition of the environment 81 can be measured directly and any contribution of a change in the environmental condition to the total frequency shift related to the reference portion 82 can be determined based on the measured data. Optical signals 54 can be launched into the waveguide 50 which can provide backscattered light signals 56 that represent backscattered light intensity for lengths of both the sensing and reference portions 80, 82 of the waveguide 50. Therefore, when an environmental condition change event occurs in the wellbore 12, the backscattered light signals 56 from the sensing portion 80 will be sensitive to the change event, while the backscattered light signals 56 from the reference portion 82 will sensitive to frequency drift of the light source 52, 122, but not affected by the change event. Traces produced based on the backscattered signals 56 from the reference portion 82 can be used as a control dataset for the traces produced based on the backscattered signals 56 from the sensing portion 80.

Traces can be produced as described in this disclosure for baseline datasets for both sensing and reference portions 80, 82 prior to the change event, as well as incremental datasets during and after the change event. These datasets can be correlated to determine the total frequency shift necessary to compensate for the environmental condition change. However, the total frequency shift for the datasets for the sensing portion 80 can include a shift necessary to compensate for the environmental condition change and a shift necessary to compensate for a frequency drift of the device 52. The shift caused by the frequency drift can be determined using the reference portion 82 of the waveguide 50. The portion 82 is kept in a controlled environment 81 that prevents (or at least minimizes) any changes in environmental conditions surrounding the reference portion 82. Therefore, the correlation of the baseline and incremental datasets for the reference portion 82 can yield the amount of the total frequency shift that is due to the frequency drift of the device 52. By removing this amount from the total frequency shift of the sensing portion 80 datasets, a compensated frequency shift value can be calculated, thereby allowing a better approximation of the true environmental condition change that occurred in the wellbore 12 during the change event.

Figure 12B:
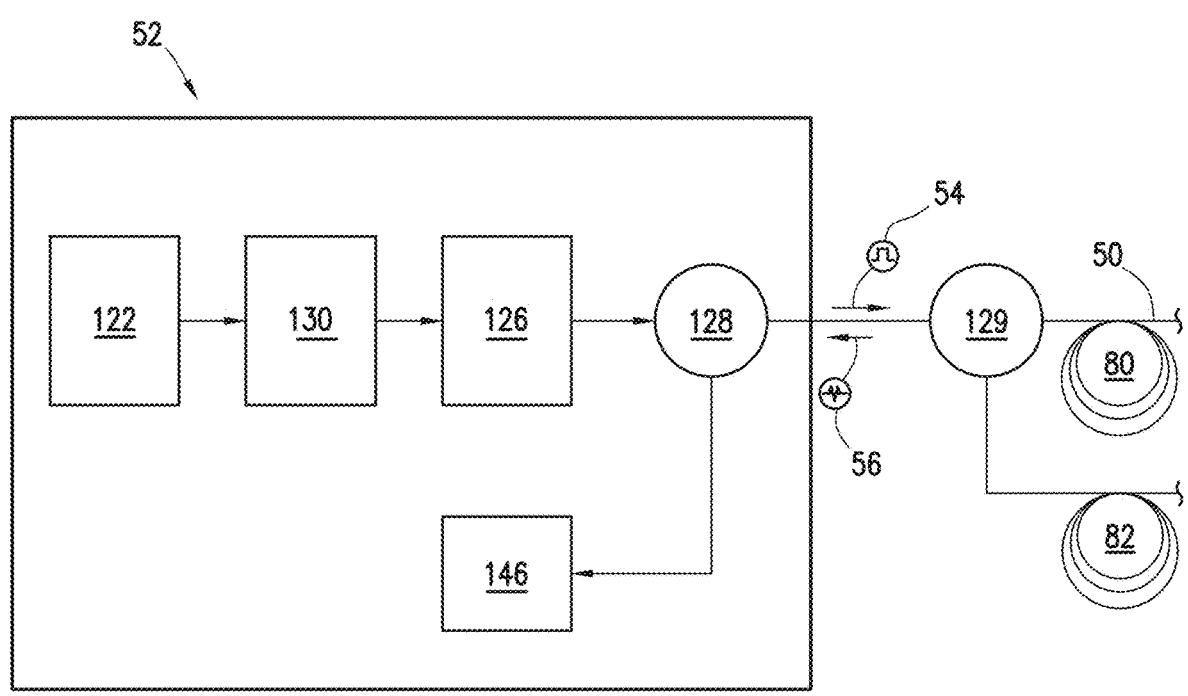
FIG. 12B is a representative block diagram of another configuration for coupling the device of FIG. 3B to an optical waveguide positioned along a wellbore in the well system, where the waveguide has a reference section and a sensing section.

FIG. 12B shows a system that can also be used to determine a better approximation of a true environmental condition change in the wellbore 12. FIG. 12B shows a device 52 coupled to a parallel coupling of the sensing and reference portions 80, 82 via circulator 129. However, the process to determine the true condition change is very similar to that described for FIG. 12A above. Traces can be produced as described in this disclosure for baseline datasets for both sensing and reference portions 80, 82 prior to the change event, as well as incremental datasets during and after the change event. These datasets can be correlated to determine the total frequency shift of the sensing portion 80 datasets necessary to compensate for the environmental condition change. Again, the total frequency shift of the sensing portion 80 datasets can include a shift necessary to compensate for the environmental condition change and a shift necessary to compensate for a frequency drift of the device 52. The shift caused by the frequency drift can be determined using the reference portion 82 of the waveguide 50. The portion 82 is kept in a controlled environment 81 that prevents (or at least minimizes) any changes in environmental conditions surrounding the reference portion 82. Therefore, the correlation of the baseline and incremental datasets for the reference portion 82 can yield a correction value that can be removed from the total frequency shift of the sensing portion 80 datasets to produce a compensated frequency shift value, thereby allowing a better approximation of the true environmental condition change that occurred in the wellbore 12 during the change event.

Figure 13:
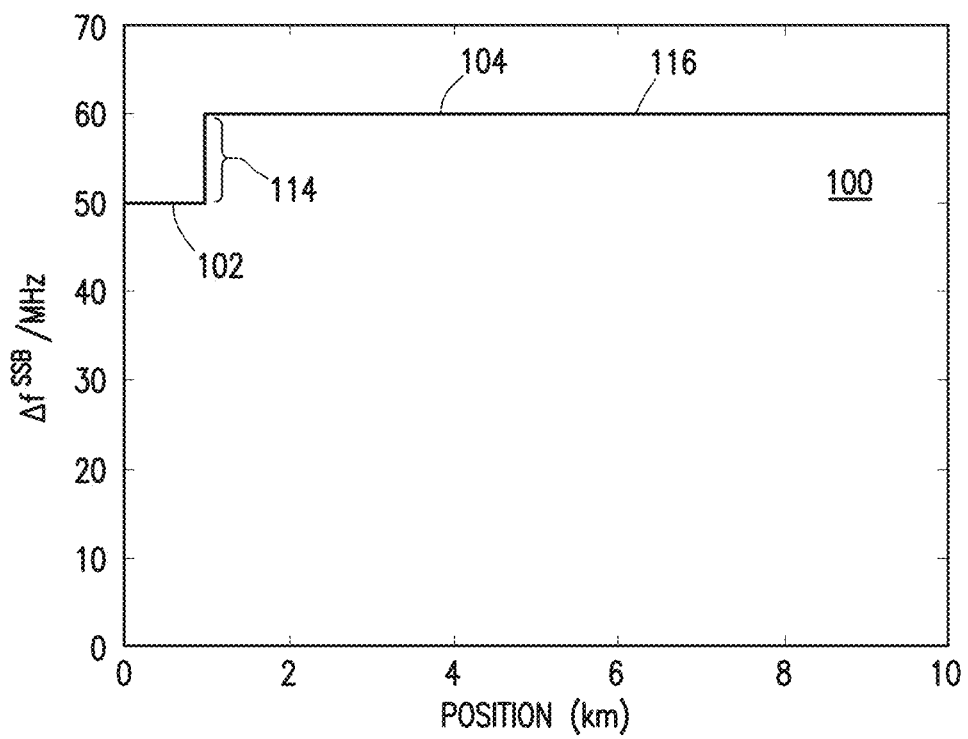
FIG. 13 shows a plot of a position along a waveguide versus a change in the SBB frequency.

FIG. 13 shows a plot 100 of a position along a waveguide 50 vs. a change in the SSB frequency $\Delta f^{SSB}$ that is calculated to compensate for frequency drift of the device 52 and a condition change in the wellbore 12 at the respective position. The trace 104 is representative of data collected for a configuration as seen in FIG. 12A where the reference portion 82 and the sensing portion 80 are in series with each other. The trace 104 can have three major sections, section 102, step 114 and section 116. Section 102 represents a length of the reference section 82 (e.g. 1 km) and section 116 represents a length of the sensing portion 80 (e.g. 9 km). Step 114 represents a step in frequency from the section 102 to the section 116 at the transition from the reference portion 82 to the sensing portion 80. The step 114 is approximately 10 MHz in this example. The value for $\Delta f^{SSB}$ in section 102 represents the frequency shift needed to compensate for the frequency drift in the device 52. The value for $\Delta f^{SSB}$ in section 116 represents the frequency shift needed to compensate for the frequency drift in the device 52 as well as the environmental condition change in the wellbore. Therefore, the 10 MHz step represents the frequency shift needed to compensate for the environmental condition change without being affected by the frequency drift of the device 52.

The amount of frequency shift not attributed to the change in the environmental condition can be seen as the correction value. The correction value, when calculated, can be used to modify the total frequency shift to provide a compensated frequency shift which then can be used to determine the actual environmental change that occurred in the wellbore 12. By removing the correction value from the total frequency shift, the effects of the device's 52 drift frequency can be removed leaving the portion attributed the environmental change.

The correction value can be determined several ways. One approach can be to install the reference portion 82 of the waveguide 50 into a controlled environment 81 that substantially prevents changes in the environmental condition and install the sensing portion 80 in the wellbore 12. In this approach, the frequency shift needed to compensate for changes to backscattered signals 56 from the reference portion 82 can be due mainly to a drift in the frequency of the device 52. By correlating a baseline dataset of traces for the reference portion 82 with a dataset of traces after the time the condition change has occurred in the wellbore 12, the amount the frequency is shifted to compensate for the device's 52 frequency drift can be used to modify the total frequency shift needed to compensate for the sensing portion 80 datasets. The frequency shift for the reference portion 82 can be removed from the frequency shift for the sensing portion 80 to produce a compensated frequency shift for the sensing portion 80, which can then be used to determine a more accurate value for the actual change in the environmental condition in the wellbore 12. In this approach, the reference portion 82 can be either in series with the sensing portion 80, as shown in FIG. 12A, or coupled in parallel with the sensing portion 80, as shown in FIG. 12B.

Another approach can be to install the reference portion 82 in a controlled environment 81 that can allow the environmental condition to change slowly, such as a large metal block for temperature, a pressure vessel for pressure, etc. The amount of the change of the environmental condition in the environment 81 can be determined by direct measurement of the change. The before (i.e. baseline) and after datasets of traces collected for the reference portion 82 can be used to determine a frequency shift necessary to compensate for any frequency drift of the device 52 as well as any change in the environmental condition in the controlled environment 81. The frequency shift attributed to the environmental condition change in the environment 81 can be determined from the measured condition change. By removing the frequency shift related to the environmental change in the environment 81, the remaining frequency shift for the reference portion 82 can be said to be mainly due to the frequency drift of the device 52. The remaining frequency shift can be used to modify the total frequency shift calculated for the sensing portion 80 to produce a compensated frequency shift, which can then be used to determine a more accurate value for the actual change in the environmental condition in the wellbore 12. In this approach, the reference portion 82 can be either in series with the sensing portion 80, as shown in FIG. 12A, or coupled in parallel with the sensing portion 80, as shown in FIG. 12B.

Figure 14:
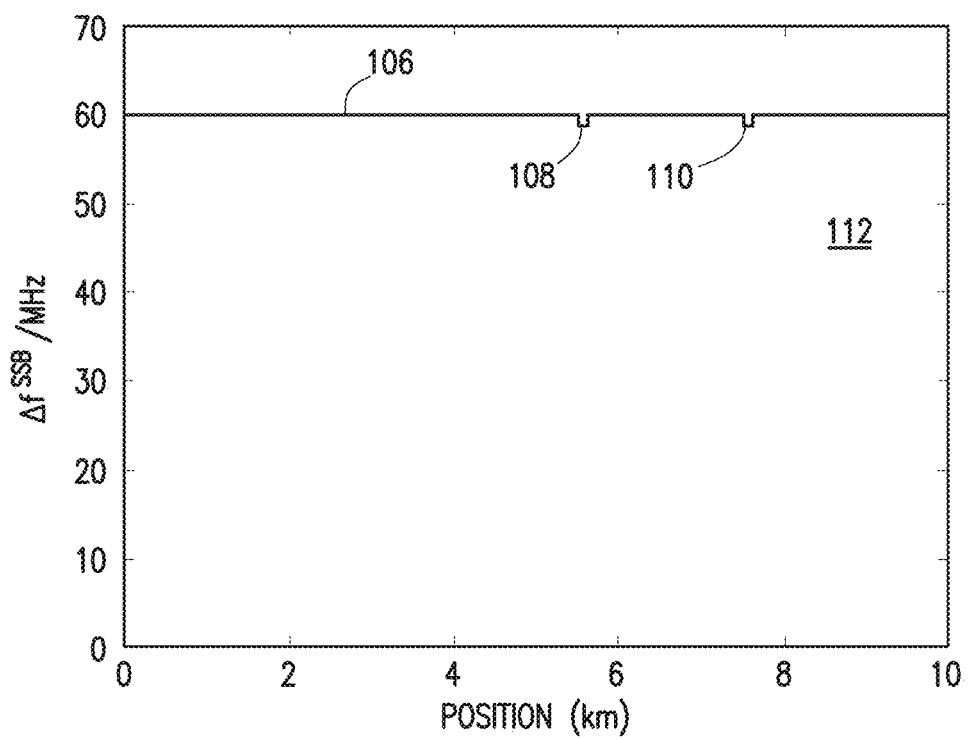
FIG. 14 shows another plot of a position along a waveguide versus a change in the SBB frequency.

The system 10 can also be used to identify locations of production zones (such as zones 60, 62, 64). Production zones can be detected by detecting a change in an environmental condition without having to calculate an amount of the change. Since relative changes may be all that is needed, then the reference portion 82 may not be necessary, and compensation for the frequency drift of the device 52 may not be needed. FIG. 14 shows a plot 112 of a position along a waveguide 50 vs. a change in the SSB frequency $\Delta f^{SSB}$ that is calculated to compensate for frequency drift of the device 52 and a condition change in the wellbore 12 at the respective position. Points 108 and 110 represent abrupt changes in the calculated SSB frequency $\Delta f^{SSB}$ at two distances along the waveguide 50. These distances can correspond to positions in the wellbore 12 of fluid entering the wellbore 12 from the formation 14. Therefore, the points 108 and 110 can indicate the locations of two production zones in the wellbore 12. It should also be understood that multiple reference portions 82 can be used to provide correction values for various possible environmental conditions.

Thus, a method for detecting environmental changes in a wellbore (or downhole) has been described. Embodiments of the method may generally include positioning (or installing) a sensing portion 80 of an optical waveguide 50 along or within a wellbore 12, positioning (or installing) a reference portion 82 of the optical waveguide 50 in a controlled environment 81, the optical waveguide 50 being coupled to an optical laser light source 122, 52 that can launch an optical signal 54 into the waveguide 50, introducing (or launching) optical light signals 54 into the optical waveguide 50 at a first frequency during a first time period, and the waveguide 50 being coupled to a receiver 52 that receives backscattered light signals 56 from the optical waveguide 50, where the backscattered light signals 56 represent an intensity of backscattered light along the sensing portion 80 or the reference portion 82 of the waveguide 50, and thus along a length (or segment) of the wellbore 12 (at least in the case of backscattered signals 56 received from the sensing portion 80).

With a change in the environmental condition (e.g. change in temperature, pressure, strain, etc.), additional backscattered light signals 56 can be obtained at one or more frequencies during or after the environmental condition change. Comparing the traces generated before the condition change to those generated after or during the change, can identify a before trace and an after (or during) trace that are substantially equal to each other, with the after trace having a difference in frequency from the before trace. This frequency difference can be used to determine the amount of change in the environmental condition that occurred when the environmental change happened.

2. The method can also generally include producing a fourth trace which represents an intensity of a fourth backscattered signal along the reference portion 82 of the waveguide 50 during the second time period, identifying a second value that is a frequency difference between the second and fourth traces, and determining a portion of the environmental condition change, when the second and fourth traces are substantially equal to each other, that can be attributed to a drift in frequency of the light source which occurs between the first and second time periods, and determining a compensated change in the environmental condition by removing the portion of the change from the total change, thereby determining the compensated change.

4. Repeating 1) the adjusting, 2) the introducing the optical signals 54 at the various frequencies, 3) the receiving the backscattered signals 56 in response to the introduction of the optical signals 54 at the various frequencies, 4) the producing the third trace, 5) and the identifying the differences between the first and third traces until the first trace substantially equals the third trace.

5. Repeating, 1) the adjusting, 2) the introducing the optical signals 54 at the various frequencies, 3) the receiving the backscattered signals 56 in response to the introduction of the optical signals 54 at the various frequencies, 4) the producing the fourth trace, and 5) the identifying the differences between the second and fourth traces until the second trace substantially equals the fourth trace.

6. The intensity of the first and third backscattered signals can represent the environmental condition along the wellbore 12, and the environmental condition can be temperature. The first frequency can comprise multiple frequencies and the first trace can comprise multiple traces with each one of the first traces corresponding to a separate one of the first frequencies, and with each of the first frequencies being different from other first frequencies. Identifying differences between each one of the first traces to the next trace, and determining the change in the environmental condition when at least one of the first traces is substantially equal to the next trace. The change in the environmental condition can include at least one of opening and closing a valve 42 to selectively increase and decrease fluid flow into the wellbore 12 from a production zone 62, 64, 66, and calculating at least one of a differential fluid pressure, a fluid flow rate, and a fluid composition based on the determined change in the environmental condition.

Other embodiments of the method of detecting a change in an environmental condition in a wellbore may generally include positioning a sensing portion 80 of an optical waveguide 50 along the wellbore 12, positioning a reference portion 82 in a controlled environment 81, introducing first optical signals 54 from a light source 52, 122 into the optical waveguide 50 at multiple first frequencies during a first time period, receiving first backscattered signals 56 from the optical waveguide 50 in response to the introduction of the first optical signals 54, producing a set of first traces corresponding to the sensing portion 80, producing a set of second traces corresponding to the reference portion 82, making a set of sensing baseline traces equal to the set of the first traces, making a set of reference baseline traces equal to the set of the second traces, and initiating a change in the environmental condition. Introducing second optical signals 54 from the light source 52, 122 into the optical waveguide 50 at multiple second frequencies after at least a portion of the environmental condition has occurred. Receiving second backscattered signals 56 from the optical waveguide 50 in response to the introduction of the second optical signals 54 and producing a set of third traces corresponding to the sensing portion 80, comparing the sensing baseline traces to the third traces, determining that at least one of the sensing baseline traces correlates to at least one of the third traces, determining an incremental change in the environmental condition based on differences between frequencies that are associated with the at least one of the sensing baseline traces and the at least one of the third traces. The method can also include adjusting the multiple second frequencies, to a new set of frequencies to prepare for more sets of traces to be produced, if the environmental change event has not completed (i.e. the environmental condition is still changing).

If the condition is still changing, then the method can repeat 1) the introducing the second optical signals, 2) the receiving the second backscattered signals, 3) the comparing the sensing baseline and the third traces, 4) the determining the correlation, 5) the determining the incremental change and 6) the adjusting the multiple second frequencies until the environmental condition is stable. When the environmental condition is stable, the incremental environmental condition changes can be combined to determine a total environmental change in the wellbore 12.

The method can also generally include determining that none of the sensing baseline traces correlate with any of the third traces, making the set of sensing baseline traces equal to a last set of the third traces that included at least one of the third traces that did correlate to at least one of the sensing baseline traces. After the environmental condition change has occurred and the environmental condition is stable, introducing fourth optical signals from the light source into the optical waveguide at multiple fourth frequencies, receiving fourth backscattered signals from the optical waveguide in response to the introduction of the fourth optical signals, producing a set of fourth traces corresponding to the reference portion, comparing the reference baseline traces to the fourth traces, determining that at least one of the reference baseline traces correlates to at least one of the fourth traces, calculating a correction value based on a difference between frequencies that are associated with the at least one of the reference baseline traces and the at least one of the fourth traces, and calculating a compensated value for the change in the environmental condition by removing the correction value from the total environmental condition change.

The environmental change event can be opening and/or closing a valve 42, where the valve 42 can be positioned at the surface or at any point within the wellbore 12, such as interconnected in a tubing string 30, deposited in the wellbore 12, positioned in a casing string 34, positioned within tubing string 30, positioned above and/or below production zones 60, 62, 64. The valve 42 can be a one-time use valve with a degradable material, where the valve 42 is initially closed and can be opened by degrading (e.g. melting, dissolving, eroding, etc.) the material to allow fluid flow through the valve. The valve 42 can include swellable material that actuates the valve 42, where swelling of the swellable material can be used to directly restrict fluid flow, or can be used to actuate the valve 42 to selectively permit and prevent fluid flow through the valve 42.

For the foregoing embodiments, the method may include any one of the following steps, alone or in combination with each other:

The method can also include determining at least one of the group consisting of fluid type, fluid composition, fluid flow, and fluid pressure differential based on the determined change in the environmental condition, and/or determining multiple incremental changes in the environmental condition during the changing of the environmental condition, and determining the change in the environmental condition by summing the incremental changes.

Additionally, a system for detecting a change in an environmental condition has been described. Embodiments of the system may generally include an optical waveguide 50 with sensing and reference portions 80, 82, with the sensing portion 80 positioned in the wellbore 12 and the reference portion 82 positioned in a controlled environment 81, a light source 52, 122 can introduce (or launch, couple, etc.) light signals 54 at a first frequency into the optical waveguide 50 during a first time period, and the source 52, 122 can introduce (or launch, couple, etc.) light signals 54 at various frequencies into the optical waveguide 50 during a second time period. A receiver 52 can produce first and second traces in response to reception of backscattered signals 56 from the respective sensing and reference portions 80, 82 of the waveguide 50 during the first time period, and can produce multiple third and multiple fourth traces in response to reception of the backscattered signals 56 from the respective sensing and reference portions 80, 82 of the waveguide 50 during the second time period, and the first trace substantially equals at least one of the third traces, where a change in the environmental condition along the wellbore can be calculated based on a difference between the frequencies that produced the first trace and the at least one of the third traces.

For any of the foregoing embodiments, the system may include any one of the following elements, alone or in combination with each other:

The second trace can substantially equal at least one of the fourth traces, and a correction value can be calculated based on a difference between the frequencies that produced the second trace and the at least one of the fourth traces, a compensated value for the change in the environmental condition can be calculated by removing the correction value from the calculated environmental condition change. The first trace can represent an intensity of at least one of the backscattered signals 56 along the sensing portion 80 of the waveguide 50, and the second trace can represent an intensity of at least another one of the backscattered signals 56 along the reference portion 82 of the waveguide 50. The change in the environmental conditions can be due to a valve 42 that is selectively opened and closed, which variably restricts fluid flow through the wellbore 12. The valve can be closed for the first time period and opened for the second time period. Alternatively, the valve can be opened for the first time period and closed for the second time period. At least one of a differential fluid pressure, a fluid flow rate, and a fluid composition of a fluid flowing from a production zone into the wellbore can be determined based on the difference between the frequencies that produced the first trace and the at least one of the third traces.

The first frequency can include multiple frequencies, the first trace can include multiple traces, and the first time period can include multiple time periods, with each of the first traces associated with one of the first time periods and one of the first frequencies, where one of the first traces can be substantially equal to the at least one of the third traces, and the change in the environmental condition along the wellbore 12 can be calculated based on a difference between the frequency associated with the one of the first traces and the frequency associated with the at least one of the third traces. The second trace can include multiple traces, with each of the second traces associated with one of the first time periods and one of the first frequencies, where one of the second traces can be substantially equal to one of the fourth traces, and a correction value can be calculated based on a difference between the frequencies that produced the one of the second traces and the one of the fourth traces, and a compensated value for the change in the environmental condition can be calculated by removing the correction value from the calculated environmental condition change.

Additionally, another embodiment of the system may generally include a sensing portion of an optical waveguide positioned along the wellbore, a reference portion of the optical waveguide positioned in a controlled environment, a light source that can introduce each one of first optical signals from a light source into the optical waveguide at a first frequency during a first time period, a receiver that can receive backscattered signals from the optical waveguide in response to the introduction of the first optical signals during the first time period, and processing circuitry that can perform operations comprising, producing a first trace which can represent an intensity of a first backscattered signal along the sensing portion of the waveguide, producing a second trace which can represent an intensity of a second backscattered signal along the reference portion of the waveguide, causing a change in the environmental condition in the wellbore, adjusting a frequency of the light source to various frequencies, introducing each one of second optical signals from the light source into the optical waveguide at one of the various frequencies during a second time period, receiving backscattered signals from the optical waveguide in response to the introduction of the second optical signals during the second time period, producing a third trace which can represent an intensity of a third backscattered signal along the sensing portion of the waveguide during the second time period, identifying a first value that is a frequency difference between the first frequency associated with the first trace and the one of the various frequencies associated with the third trace, and determining the total change in the environmental condition based on the first value when the first and third traces are substantially equal to each other.

The operations can also include producing a fourth trace which can represent an intensity of a fourth backscattered signal along the reference portion of the waveguide during the second time period, identifying a second value that is a frequency difference between the first frequency associated with the second trace and the one of the various frequencies associated with the fourth trace, and determining a portion of the environmental condition change, when the second and fourth traces are substantially equal to each other, that is attributed to a drift in frequency of the light source which occurs between the first and second time periods, and determining a compensated change in the environmental condition by removing the portion of the change from the total change, thereby determining the compensated change.

The operations can also include repeating the adjusting, the introducing the second optical signals at the various frequencies, the receiving the backscattered signals in response to the introduction of the second optical signals at the various frequencies, the producing the third trace, and the identifying the differences between the first and third traces until the first trace substantially equals the third trace, and/or the second trace substantially equals the fourth trace.

The intensity of the first and third backscattered signals can represent the environmental condition along the wellbore, and the environmental condition can be temperature. The first frequency can include multiple frequencies and the first trace can include multiple traces with each one of the first traces corresponding to a separate one of the first frequencies, and with each of the first frequencies being different from other first frequencies. The operations can also include identifying differences between each one of the first traces to the next trace, and determining the change in the environmental condition when at least one of the first traces is substantially equal to the next trace.

The environmental condition change can include at least one of opening and closing a valve to selectively increase and decrease fluid flow into the wellbore from a production zone. The operations can also include calculating at least one of a differential fluid pressure, a fluid flow rate, and a fluid composition based on the determined change in the environmental condition.

Additionally, another embodiment of the system may generally include a sensing portion of an optical waveguide positioned along the wellbore, a reference portion of the optical waveguide positioned in a controlled environment, a light source that can introduce first optical signals from a light source into the optical waveguide at multiple first frequencies during a first time period, a receiver that can receive first backscattered signals from the optical waveguide in response to the introduction of the first optical signals, and processing circuitry that can perform operations comprising, producing a set of first traces corresponding to the sensing portion, and a set of second traces corresponding to the reference portion, making a set of sensing baseline traces equal to the set of the first traces and making a set of reference baseline traces equal to the set of the second traces, initiating a change in the environmental condition, introducing second optical signals from the light source into the optical waveguide at multiple second frequencies after at least a portion of the environmental condition has occurred, receiving second backscattered signals from the optical waveguide in response to the introduction of the second optical signals, producing a set of third traces corresponding to the sensing portion, comparing the sensing baseline traces to the third traces, determining that at least one of the sensing baseline traces correlates to at least one of the third traces, determining an incremental change in the environmental condition based on differences between frequencies that are associated with the at least one of the sensing baseline traces and the at least one of the second traces, adjusting the multiple second frequencies, repeating 1) the introducing the second optical signals, 2) the receiving the second backscattered signals, 3) the comparing the sensing baseline and the third traces, 4) the determining the correlation, 5) the determining the incremental change and 6) the adjusting the multiple second frequencies until the environmental condition is stable, and combining the incremental environmental condition changes to determine a total environmental change in the wellbore.

The operations can also include determining that none of the sensing baseline traces correlate with any of the third traces, making the set of sensing baseline traces equal to a last set of the third traces that included at least one of the third traces that did correlate to at least one of the sensing baseline traces. The operations can also include determining at least one of the group consisting of fluid type, fluid composition, fluid flow, and fluid pressure differential based on the total environmental condition change in the wellbore.

The operations can also include introducing fourth optical signals from the light source into the optical waveguide at multiple fourth frequencies after the environmental condition change has occurred and the environmental condition is stable, receiving fourth backscattered signals from the optical waveguide in response to the introduction of the fourth optical signals, producing a set of fourth traces corresponding to the reference portion, comparing the reference baseline traces to the fourth traces, determining that at least one of the reference baseline traces correlates to at least one of the fourth traces, calculating a correction value based on a difference between frequencies that are associated with the at least one of the reference baseline traces and the at least one of the fourth traces, and calculating a compensated value for the change in the environmental condition by removing the correction value from the total environmental condition change.

Furthermore, the illustrative methods described herein may be implemented by a system comprising processing circuitry that can include a non-transitory computer readable medium comprising instructions which, when executed by at least one processor of the processing circuitry, causes the processor to perform any of the methods described herein.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A method of detecting changes in an environmental condition along a wellbore, the method comprising:
   positioning a sensing portion of an optical waveguide along the wellbore;
   positioning a reference portion of the optical waveguide in a controlled environment;
   introducing each one of first optical signals from a light source into the optical waveguide at a first frequency during a first time period;
   receiving backscattered signals from the optical waveguide in response to the introduction of the first optical signals during the first time period;
   producing a first trace which represents an intensity of a first backscattered signal along the sensing portion of the waveguide;
   producing a second trace which represents an intensity of a second backscattered signal along the reference portion of the waveguide;
   causing a change in the environmental condition in the wellbore;
   adjusting a frequency of the light source to various frequencies;
   introducing each one of second optical signals from the light source into the optical waveguide at one of the various frequencies during a second time period;
   receiving backscattered signals from the optical waveguide in response to the introduction of the second optical signals during the second time period;
   producing a third trace which represents an intensity of a third backscattered signal along the sensing portion of the waveguide during the second time period;
   identifying a first value that is a frequency difference between the first frequency associated with the first trace and the one of the various frequencies associated with the third trace; and
   determining the total change in the environmental condition based on the first value when the first and third traces are substantially equal to each other.

2. The method of claim 1, further comprising:
   producing a fourth trace which represents an intensity of a fourth backscattered signal along the reference portion of the waveguide during the second time period;
   identifying a second value that is a frequency difference between the first frequency associated with the second trace and the one of the various frequencies associated with the fourth trace; and
   determining a portion of the environmental condition change, when the second and fourth traces are substantially equal to each other, that is attributed to a drift in frequency of the light source which occurs between the first and second time periods.

3. The method of claim 2, further comprising, determining a compensated change in the environmental condition by removing the portion of the change from the total change, thereby determining the compensated change.

4. The method of claim 1, wherein the adjusting, the introducing the second optical signals at the various frequencies, the receiving the backscattered signals in response to the introduction of the second optical signals at the various frequencies, the producing the third trace, and the identifying the differences between the first and third traces are repeated until the first trace substantially equals the third trace.

5. The method of claim 4, wherein the adjusting, the introducing the second optical signals at the various frequencies, the receiving the backscattered signals in response to the introduction of the second optical signals at the various frequencies, the producing the fourth trace, and the identifying the differences between the second and fourth traces are repeated until the second trace substantially equals the fourth trace.

6. The method of claim 1, wherein the intensity of the first and third backscattered signals represent the environmental condition along the wellbore.

7. The method of claim 1, wherein the first frequency comprises multiple frequencies and the first trace comprises multiple traces with each one of the first traces corresponding to a separate one of the first frequencies, and with each of the first frequencies being different from other first frequencies.

8. The method of claim 7, wherein the identifying further comprises identifying differences between each one of the first traces to the next trace, and wherein the determining further comprises determining the change in the environmental condition when at least one of the first traces is substantially equal to the next trace.

9. The method of claim 1, wherein:
causing the change in the environmental condition further comprises at least one of opening and closing a valve to selectively increase and decrease fluid flow into the wellbore from a production zone; or
the determining further comprises calculating at least one of a differential fluid pressure, a fluid flow rate, and a fluid composition based on the determined change in the environmental condition.

10. A system that detects a change in an environmental condition along a wellbore, the system comprising:
an optical waveguide with sensing and reference portions, with the sensing portion positioned in the wellbore and the reference portion positioned in a controlled environment;
a light source that introduces each one of first light signals at a first frequency into the optical waveguide during a first time period, and the source introduces each one of second light signals at one of various frequencies into the optical waveguide during a second time period; and
a receiver that produces first and second traces in response to reception of backscattered signals from the respective sensing and reference portions of the waveguide during the first time period, and produces multiple third and multiple fourth traces in response to reception of the backscattered signals from the respective sensing and reference portions of the waveguide during the second time period, and the first trace substantially equals at least one of the third traces,
wherein a change in the environmental condition along the wellbore is calculated based on a difference between the first frequency associated with the first trace and the one of the various frequencies associated with the at least one of the third traces.

11. The system according to claim 10, wherein the second trace substantially equals at least one of the fourth traces, and wherein a correction value is calculated based on a difference between the first frequency associated with the second trace and the one of the various frequencies associated with the at least one of the fourth traces.

12. The system according to claim 11, wherein a compensated value for the change in the environmental condition is calculated by removing the correction value from the calculated environmental condition change.

13. The system according to claim 10, wherein:
the first trace represents an intensity of at least one of the backscattered signals along the sensing portion of the waveguide, and the second trace represents an intensity of at least another one of the backscattered signals along the reference portion of the waveguide; or
the change in the environmental conditions is due to a valve that is selectively opened and closed, which variably restricts fluid flow through the wellbore.

14. The system according to claim 13, wherein:
the valve is closed for the first time period and the valve is opened for the second time period; or
the valve is opened for the first time period and the valve is closed for the second time period.

15. The system according to claim 10, wherein:
at least one of a differential fluid pressure, a fluid flow rate, and a fluid composition of a fluid flowing from a production zone into the wellbore is determined based on the difference between the first frequency associated with the first trace and the one of the various frequencies associated with the at least one of the third traces; or
the first frequency comprises multiple frequencies, the first trace comprises multiple traces, and the first time period comprises multiple time periods, with each of the first traces associated with one of the first time periods and one of the first frequencies, wherein one of the first traces is substantially equal to the at least one of the third traces, and the change in the environmental condition along the wellbore is calculated based on a difference between the one of the first frequencies associated with the one of the first traces and the one of the various frequencies associated with the at least one of the third traces.

16. The system according to claim 15, wherein the second trace comprises multiple traces, with each of the second traces associated with one of the first time periods and one of the first frequencies, wherein one of the second traces is substantially equal to one of the fourth traces, and a correction value is calculated based on a difference between the one of the first frequencies associated with the one of the second traces and the one of the various frequencies associated with the one of the fourth traces.

17. The system according to claim 16, wherein a compensated value for the change in the environmental condition is calculated by removing the correction value from the calculated environmental condition change.

18. A method for detecting a change in an environmental condition along a wellbore, the method comprising:
positioning a sensing portion of an optical waveguide along the wellbore;
positioning a reference portion of the optical waveguide in a controlled environment;
introducing first optical signals from a light source into the optical waveguide at multiple first frequencies during a first time period;
receiving first backscattered signals from the optical waveguide in response to the introduction of the first optical signals;
producing a set of first traces corresponding to the sensing portion, and a set of second traces corresponding to the reference portion;

making a set of sensing baseline traces equal to the set of the first traces, and making a set of reference baseline traces equal to the set of the second traces;

initiating a change in the environmental condition;

introducing second optical signals from the light source into the optical waveguide at multiple second frequencies after at least a portion of the environmental condition has occurred;

receiving second backscattered signals from the optical waveguide in response to the introduction of the second optical signals;

producing a set of third traces corresponding to the sensing portion;

comparing the sensing baseline traces to the third traces;

determining that at least one of the sensing baseline traces correlates to at least one of the third traces;

determining an incremental change in the environmental condition based on differences between frequencies that are associated with the at least one of the sensing baseline traces and the at least one of the second traces;

adjusting the multiple second frequencies;

repeating 1) the introducing the second optical signals, 2) the receiving the second backscattered signals, 3) the comparing the sensing baseline and the third traces, 4) the determining the correlation, 5) the determining the incremental change and 6) the adjusting the multiple second frequencies until the environmental condition is stable; and combining the incremental environmental condition changes to determine a total environmental change in the wellbore.

19. The method of claim 18, wherein the determining the correlation further comprises determining that none of the sensing baseline traces correlate with any of the third traces, making the set of sensing baseline traces equal to a last set of the third traces that included at least one of the third traces that did correlate to at least one of the sensing baseline traces.

20. The method of claim 18, further comprising:

determining at least one of the group consisting of fluid type, fluid composition, fluid flow, and fluid pressure differential based on the total environmental condition change in the wellbore; or after the environmental condition change has occurred and the environmental condition is stable, introducing fourth optical signals from the light source into the optical waveguide at multiple fourth frequencies, receiving fourth backscattered signals from the optical waveguide in response to the introduction of the fourth optical signals, producing a set of fourth traces corresponding to the reference portion, comparing the reference baseline traces to the fourth traces, and determining that at least one of the reference baseline traces correlates to at least one of the fourth traces.

21. The method of claim 20, further comprising calculating a correction value based on a difference between frequencies that are associated with the at least one of the reference baseline traces and the at least one of the fourth traces.

22. The method of claim 21, further comprising calculating a compensated value for the change in the environmental condition by removing the correction value from the total environmental condition change.

* * * * *